(12) United States Patent
Norman et al.

(10) Patent No.: US 11,561,911 B2
(45) Date of Patent: Jan. 24, 2023

(54) CHANNEL CONTROLLER FOR SHARED MEMORY ACCESS

(71) Applicant: SUNRISE MEMORY CORPORATION, San Jose, CA (US)

(72) Inventors: Robert D. Norman, Pendleton, OR (US); Richard S. Chernicoff, Mercer Island, WA (US); Eli Harari, Saratoga, CA (US)

(73) Assignee: SUNRISE MEMORY CORPORATION, San Jose, CA (US)

( * ) Notice: Subject to any disclaimer, the term of this patent is extended or adjusted under 35 U.S.C. 154(b) by 0 days.

(21) Appl. No.: 17/183,154

(22) Filed: Feb. 23, 2021

(65) Prior Publication Data
US 2021/0263866 A1     Aug. 26, 2021

Related U.S. Application Data

(60) Provisional application No. 63/040,347, filed on Jun. 17, 2020, provisional application No. 62/980,571, filed on Feb. 24, 2020.

(51) Int. Cl.
*G06F 3/00*    (2006.01)
*G06F 13/16*   (2006.01)
*G06F 13/42*   (2006.01)
*G06F 13/28*   (2006.01)

(52) U.S. Cl.
CPC .......... *G06F 13/1668* (2013.01); *G06F 13/28* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| 4,213,139 A | 7/1980 | Rao |
| 4,984,153 A * | 1/1991 | Kregness .................. G06F 9/52 |
| | | 711/151 |
| 5,388,246 A * | 2/1995 | Kasai .................. G06F 13/1689 |
| | | 710/52 |
| 5,583,808 A | 12/1996 | Brahmbhatt |
| 5,646,886 A | 7/1997 | Brahmbhatt |
| 5,656,842 A | 8/1997 | Iwamatsu |

(Continued)

FOREIGN PATENT DOCUMENTS

| KR | 20120085591 A1 | 8/2012 |
| WO | 2018236937 A1 | 12/2018 |

OTHER PUBLICATIONS www.wikipedia.com, Direct Memory Access, 2017, p. 1-2 (Year: 2017).*

(Continued)

*Primary Examiner* — Henry Tsai
*Assistant Examiner* — Dean Phan

(57) ABSTRACT

A shared memory provides multi-channel access from multiple computing or host devices. A priority circuit prioritizes the multiple memory requests that are submitted as bids from the multiple host channels, such that those memory access requests that do not give rise to a conflict may proceed in parallel. The shared memory may be multi-ported and a routing circuit routes the prioritized memory access request to the appropriate memory ports where the allowed memory access requests may be carried out.

42 Claims, 17 Drawing Sheets

(56) References Cited

U.S. PATENT DOCUMENTS

| | | | |
|---|---|---|---|
| 5,768,192 | A | 6/1998 | Eitan |
| 5,789,776 | A | 8/1998 | Lancaster et al. |
| 5,915,167 | A | 6/1999 | Leedy |
| 6,040,605 | A | 3/2000 | Sano et al. |
| 6,057,862 | A * | 5/2000 | Margulis ............... H04N 19/61 375/E7.129 |
| 6,107,133 | A | 8/2000 | Furukawa et al. |
| 6,118,171 | A | 9/2000 | Davies et al. |
| 6,130,838 | A | 10/2000 | Kim et al. |
| 6,434,053 | B1 | 8/2002 | Fujiwara |
| 6,580,124 | B1 | 6/2003 | Cleeves et al. |
| 6,744,094 | B2 | 6/2004 | Forbes |
| 6,774,458 | B2 | 8/2004 | Fricke et al. |
| 6,873,004 | B1 | 3/2005 | Han et al. |
| 6,881,994 | B2 | 4/2005 | Lee et al. |
| 6,946,703 | B2 | 9/2005 | Ryu et al. |
| 7,005,350 | B2 | 2/2006 | Walker et al. |
| 7,284,226 | B1 | 10/2007 | Kondapalli |
| 7,307,308 | B2 | 12/2007 | Lee |
| 7,489,002 | B2 | 2/2009 | Forbes et al. |
| 7,524,725 | B2 | 4/2009 | Chung |
| 7,612,411 | B2 | 11/2009 | Walker |
| 8,026,521 | B1 | 9/2011 | Or-Bach et al. |
| 8,139,418 | B2 | 3/2012 | Carman |
| 8,178,396 | B2 | 5/2012 | Sinha et al. |
| 8,417,917 | B2 | 4/2013 | Emma et al. |
| 8,630,114 | B2 | 1/2014 | Lue |
| 8,653,672 | B2 | 2/2014 | Leedy |
| 8,767,473 | B2 | 7/2014 | Shim et al. |
| 8,848,425 | B2 | 9/2014 | Schloss |
| 8,878,278 | B2 | 11/2014 | Alsmeier et al. |
| 9,190,293 | B2 | 11/2015 | Wang et al. |
| 9,202,694 | B2 | 12/2015 | Konevecki et al. |
| 9,230,985 | B1 | 1/2016 | Wu et al. |
| 9,256,026 | B2 | 2/2016 | Thacker et al. |
| 9,297,971 | B2 | 3/2016 | Thacker et al. |
| 9,412,752 | B1 | 8/2016 | Yeh et al. |
| 9,455,268 | B2 | 9/2016 | Oh et al. |
| 9,502,345 | B2 | 11/2016 | Youn et al. |
| 9,620,605 | B2 | 4/2017 | Liang et al. |
| 9,633,944 | B2 | 4/2017 | Kim |
| 9,748,172 | B2 | 8/2017 | Takaki |
| 9,799,761 | B2 | 10/2017 | Or-Bach et al. |
| 9,842,651 | B2 | 12/2017 | Harari |
| 9,892,800 | B2 | 2/2018 | Harari |
| 9,911,497 | B1 | 3/2018 | Harari |
| 10,074,667 | B1 | 9/2018 | Higashi |
| 10,096,364 | B2 | 10/2018 | Harari |
| 10,121,553 | B2 | 11/2018 | Harari |
| 10,217,719 | B2 | 2/2019 | Watanabe et al. |
| 10,249,370 | B2 | 4/2019 | Harari |
| 10,254,968 | B1 | 4/2019 | Gazit et al. |
| 10,283,493 | B1 | 5/2019 | Nishida |
| 10,319,696 | B1 | 6/2019 | Nakano |
| 10,373,956 | B2 | 8/2019 | Gupta et al. |
| 10,381,370 | B2 | 8/2019 | Shin et al. |
| 10,381,378 | B1 | 8/2019 | Harari |
| 10,395,737 | B2 | 8/2019 | Harari |
| 10,431,596 | B2 | 10/2019 | Herner et al. |
| 10,475,812 | B2 | 11/2019 | Harari |
| 10,622,377 | B2 | 4/2020 | Harari et al. |
| 10,644,826 | B2 | 4/2020 | Wuu et al. |
| 10,692,837 | B1 | 6/2020 | Nguyen et al. |
| 10,692,874 | B2 | 6/2020 | Harari et al. |
| 10,725,099 | B2 | 7/2020 | Ware |
| 10,742,217 | B2 | 8/2020 | Dabral et al. |
| 10,978,427 | B2 | 4/2021 | Li et al. |
| 11,152,343 | B1 | 10/2021 | Dokania et al. |
| 2001/0030340 | A1 | 10/2001 | Fujiwara |
| 2001/0053092 | A1 | 12/2001 | Kosaka et al. |
| 2002/0028541 | A1 | 3/2002 | Lee et al. |
| 2002/0051378 | A1 | 5/2002 | Ohsawa |
| 2002/0193484 | A1 | 12/2002 | Albee |
| 2004/0043755 | A1 * | 3/2004 | Shimooka ............ G06F 3/0613 455/410 |
| 2004/0214387 | A1 | 10/2004 | Madurawe et al. |
| 2004/0246807 | A1 | 12/2004 | Lee |
| 2004/0262681 | A1 | 12/2004 | Masuoka et al. |
| 2004/0262772 | A1 | 12/2004 | Ramanathan et al. |
| 2005/0128815 | A1 | 6/2005 | Ishikawa et al. |
| 2005/0280061 | A1 | 12/2005 | Lee |
| 2006/0080457 | A1 * | 4/2006 | Hiramatsu ............ H04L 67/322 709/232 |
| 2006/0155921 | A1 | 7/2006 | Gorobets et al. |
| 2006/0212651 | A1 * | 9/2006 | Ashmore ............ G06F 11/1441 711/E12.019 |
| 2007/0192518 | A1 * | 8/2007 | Rupanagunta ........ G06F 13/124 710/62 |
| 2007/0236979 | A1 | 10/2007 | Takashima |
| 2008/0022026 | A1 * | 1/2008 | Yang .................... G06F 13/387 710/200 |
| 2008/0239812 | A1 | 10/2008 | Naofumi et al. |
| 2009/0057722 | A1 | 3/2009 | Masuoka et al. |
| 2009/0157946 | A1 | 6/2009 | Arya |
| 2009/0237996 | A1 | 9/2009 | Kirsch et al. |
| 2009/0279360 | A1 | 11/2009 | Peter et al. |
| 2009/0316487 | A1 | 12/2009 | Lee et al. |
| 2010/0121994 | A1 | 5/2010 | Kim et al. |
| 2010/0124116 | A1 | 5/2010 | Takashi et al. |
| 2011/0115011 | A1 | 5/2011 | Masuoka et al. |
| 2011/0134705 | A1 | 6/2011 | Jones et al. |
| 2011/0208905 | A1 | 8/2011 | Shaeffer et al. |
| 2011/0298013 | A1 | 12/2011 | Hwang et al. |
| 2011/0310683 | A1 | 12/2011 | Gorobets |
| 2012/0182801 | A1 | 7/2012 | Lue |
| 2012/0243314 | A1 | 9/2012 | Takashi |
| 2012/0307568 | A1 | 12/2012 | Banna et al. |
| 2013/0256780 | A1 | 10/2013 | Kai et al. |
| 2014/0015036 | A1 | 1/2014 | Fursin et al. |
| 2014/0075135 | A1 | 3/2014 | Choi et al. |
| 2014/0117366 | A1 | 5/2014 | Saitoh |
| 2014/0151774 | A1 | 6/2014 | Rhie |
| 2014/0173017 | A1 * | 6/2014 | Takagi .................... H04L 67/06 709/213 |
| 2014/0247674 | A1 | 9/2014 | Karda et al. |
| 2014/0328128 | A1 | 11/2014 | Louie et al. |
| 2014/0340952 | A1 | 11/2014 | Ramaswamy et al. |
| 2015/0155876 | A1 | 6/2015 | Jayasena et al. |
| 2015/0194440 | A1 | 7/2015 | Noh et al. |
| 2015/0220463 | A1 * | 8/2015 | Fluman .................. G06F 3/061 711/158 |
| 2015/0249143 | A1 | 9/2015 | Sano |
| 2015/0263005 | A1 | 9/2015 | Zhao et al. |
| 2015/0372099 | A1 | 12/2015 | Chen et al. |
| 2016/0013156 | A1 | 1/2016 | Zhai et al. |
| 2016/0035711 | A1 | 2/2016 | Hu |
| 2016/0086970 | A1 | 3/2016 | Peng |
| 2016/0225860 | A1 | 8/2016 | Karda et al. |
| 2016/0248631 | A1 | 8/2016 | Duchesneau |
| 2016/0314042 | A1 | 10/2016 | Plants |
| 2016/0321002 | A1 * | 11/2016 | Jung ................... G06F 12/0246 |
| 2017/0092370 | A1 | 3/2017 | Harari |
| 2017/0092371 | A1 | 3/2017 | Harari |
| 2017/0148517 | A1 | 5/2017 | Harari |
| 2017/0148810 | A1 | 5/2017 | Kai et al. |
| 2017/0358594 | A1 | 12/2017 | Lu et al. |
| 2018/0095127 | A1 | 4/2018 | Pappu et al. |
| 2018/0108416 | A1 | 4/2018 | Harari |
| 2018/0269229 | A1 | 9/2018 | Or-Bach et al. |
| 2018/0331042 | A1 | 11/2018 | Manusharow et al. |
| 2018/0366471 | A1 | 12/2018 | Harari et al. |
| 2018/0366485 | A1 | 12/2018 | Harari |
| 2018/0366489 | A1 | 12/2018 | Harari et al. |
| 2019/0006009 | A1 | 1/2019 | Harari |
| 2019/0019564 | A1 | 1/2019 | Li et al. |
| 2019/0028387 | A1 | 1/2019 | Gray |
| 2019/0067327 | A1 | 2/2019 | Herner et al. |
| 2019/0121699 | A1 * | 4/2019 | Cohen ................ G06F 11/1438 |
| 2019/0148286 | A1 | 5/2019 | Or-Bach et al. |
| 2019/0157296 | A1 | 5/2019 | Harari et al. |
| 2019/0171391 | A1 | 6/2019 | Dubeyko et al. |
| 2019/0180821 | A1 | 6/2019 | Harari |
| 2019/0206890 | A1 | 7/2019 | Harari et al. |
| 2019/0238134 | A1 | 8/2019 | Lee et al. |

(56) References Cited

U.S. PATENT DOCUMENTS

| | | | |
|---|---|---|---|
| 2019/0244971 | A1 | 8/2019 | Harari |
| 2019/0259769 | A1 | 8/2019 | Karda et al. |
| 2019/0303042 | A1 | 10/2019 | Kim et al. |
| 2019/0325945 | A1 | 10/2019 | Linus |
| 2019/0325964 | A1 | 10/2019 | Harari |
| 2019/0319044 | A1 | 11/2019 | Harari |
| 2019/0348424 | A1 | 11/2019 | Karda et al. |
| 2019/0355747 | A1 | 11/2019 | Herner et al. |
| 2019/0370005 | A1 | 12/2019 | Moloney et al. |
| 2019/0370117 | A1 | 12/2019 | Fruchtman et al. |
| 2020/0051990 | A1 | 2/2020 | Harari et al. |
| 2020/0098738 | A1 | 3/2020 | Herner et al. |
| 2020/0098779 | A1 | 3/2020 | Cernea et al. |
| 2020/0176468 | A1 | 6/2020 | Herner et al. |
| 2020/0194416 | A1 | 6/2020 | Or-Bach et al. |
| 2020/0201718 | A1* | 6/2020 | Richter ............... G06F 11/1004 |
| 2020/0243486 | A1* | 7/2020 | Quader ................. G06N 3/063 |
| 2020/0258897 | A1 | 8/2020 | Yan et al. |
| 2022/0043596 | A1 | 2/2022 | Madraswala et al. |

OTHER PUBLICATIONS

"PCT Search Report and Written Opinion, PCT/US2021/016964", dated Jun. 15, 2021, 19 pages.
"EP Extended Search Report EP168690149.3", dated Oct. 18, 2019.
"European Search Report, EP 16852238.1", dated Mar. 28, 2019.
"European Search Report, EP17844550.8", dated Aug. 12, 2020, 11 pages.
"Invitation to Pay Additional Fees (PCT/ISA/206), PCT/US2020/015710", dated Mar. 20, 2020, 2 pages.
"Notification of Reasons for Refusal, Japanese Patent Application 2018-527740", (English translation), dated Nov. 4, 2020, 8 pages.
"Partial European Search Report EP 16869049.3", dated Jul. 1, 2019, pp. 1-12.
"PCT Search Report and Written Opinion, PCT/US2018/038373", dated Sep. 10, 2018.
"PCT Search Report and Written Opinion, PCT/US2019/014319", dated Apr. 15, 2019.
"PCT Search Report and Written Opinion, PCT/US2019/052164", dated Feb. 27, 2020.
"PCT Search Report and Written Opinion, PCT/US2019/052446", dated Dec. 11, 2019.
"PCT Search Report and Written Opinion, PCT/US2020/015710", dated Jun. 9, 2020.
"PCT Search Report and Written Opinion, PCT/US2020/017494", dated Jul. 20, 2020, 13 pages.
Hou, S. Y., et al., "Wafer-Leval Integration of an Advanced Logic-Memory System Through the Second-Generation CoWoS Technology", IEEE Transactions on Electron Devices, vol. 64, No. 10, Oct. 2017, 4071-4077.
Kim, N., et al., "Multi-layered Vertical gate NANO Flash Overcoming Stacking Limit for Terabit Density Storage", Symposium on VLSI Tech Dig. of Technical Papers, 2009, pp. 188-189.
Lue, H.T., et al., "A Highly Scalable 8-Layer 3D Vertical-gate {VG} TFT NANO Flash Using Junction-Free Buried Channel BE-SONOS Device", Symposium on VLSI: Tech. Dig. of Technical Papers, 2010, pp. 131-132.
Tanaka, T., et al., "A 768 GB 3b/cell 3D-Floaling-Gate NANO Flash Memory", Digest of Technical Papers, the 2016 EEE International Solid-Slate Circuits Conference, 2016, pp. 142-144.
Wann, H.C., et al., "High-Endurance Ultra-Thin Tunnel Oxide in Monos Device Structure for Dynamic Memory Application", IEEE Electron Device letters, vol. 16, No. 11, Nov. 1995, pp. 491-493.

\* cited by examiner

CHANNEL CONTROLLER FOR SHARED MEMORY ACCESS

CROSS REFERENCE TO RELATED APPLICATIONS

The present application relates to and claims priority of U.S. provisional application ("Provisional Application I"), Ser. No. 62/980,571, entitled "Channel Controller For Shared Memory Access," filed on Feb. 24, 2020. This application also claims priority to U.S. provisional application ("Provisional Application II"), Ser. No. 63/040,347, entitled "Channel Controller For Shared Memory Access," filed on Jun. 17, 2020. Provisional Application I and Provisional Application II are hereby incorporated by reference in their entireties.

The present application is also related to (i) U.S. provisional patent application ("Provisional Application III"), Ser. No. 62/971,859, entitled "Quasi-volatile Memory System," filed on Feb. 7, 2020; (ii) U.S. provisional patent application ("Provisional Application IV"), Ser. No. 62/980,596, entitled "Quasi-volatile Memory System-Level Memory," filed on Feb. 24, 2020; (iii) U.S. provisional patent application ("Provisional Application V"), Ser. No. 62/971,720, entitled "High-Capacity Memory Circuit with Low Effective Latency," filed on Feb. 7, 2020; Provisional Application V is now U.S. Patent application Ser. No. 17/169,87, filed Feb. 5, 2021, and published as U.S. Publication No. 2021/0247910 A1; (iv) U.S. provisional patent application ("Provisional Application VI"), Ser. No. 63/027,850, entitled "Quasi-volatile Memory System-Level Memory," filed on May 20, 2020; Provisional Applications III, IV and VI are now U.S. patent application Ser. No. 17/169,212, filed Feb. 5, 2021, and published as U.S. Publication No. 2021/0248094 A1; and (v) U.S. provisional application ("Provisional Application VII"), Ser. No. 62/980,600, entitled "Memory Modules or Memory-Centric Structures," filed on Feb. 24, 2020; Provisional Application VII is now U.S. patent application Ser. No. 17/176,860, filed Feb. 16, 2021, and published as U.S. Publication No. 2021/0263673 A1; Provisional Applications III-VII (collectively, the "Provisional Applications") are hereby incorporated by reference in their entireties.

BACKGROUND OF THE INVENTION

1. Field of the Invention

The present invention relates generally to computer systems and memory technology. More specifically, the present invention relates to a multi-processor computing system with a memory-centric architecture around a multi-ported shared memory. The memory may appear to the processors as a random-access memory (RAM) without regard to the underlying implementing technology.

2. Description of the Related Art

In a system with non-uniform memory access (NUMA), the memory is not shared and is specific to the computing environment. For example, FIG. 1 shows a 3-computer system (i.e., a system with 3 computing units) 100 using NUMA memory. As shown in FIG. 1, central processing unit (CPU) 101-1 to 101-3 are each provided with an associated memory unit, seen in FIG. 1 as memory units 102-1 to 102-3. Memory units 102-1 to 102-3 are accessible over a dedicated, corresponding one of memory buses 103-1 and 103-3. To access the contents of a memory under control of another CPU, a CPU requests access to the memory over a shared processor bus (e.g., inter-processor communication (IPC) bus 104-1 or 104-2) or by way of a server over a PCIe or Ethernet bus. Such a processor typically incurs substantial delay, due primarily to the "house-keeping" software protocol (e.g., operations relating to transaction registering and memory coherency) and delays through intervening switching devices, even though the CPU-to-CPU processor bus provides fast responses. Such delays are compounded when multiple processor buses are involved.

Better data sharing is a long-felt need, as the overhead in existing systems becomes increasingly intolerable. A centralized memory with low latency and high throughput CPU attachments is desired. One example of a memory shared among many processors is a HADOOP-style system in which each processor has its own memory but shares it over a network of clustered memory servers (e.g., over ethernet). In one implementation, one server in each cluster is designated "master" and keeps a master record of all files within that cluster. A master server in each cluster receives client memory access requests, locates the slave servers with control over the desired data in each client request, and dividing service of the client request to those servers. In a HADOOP system, each file typically spreads out in data blocks (e.g., each 64 or 128 MB) among numerous working servers in the cluster, and each block may be operated on by the processor having control of the block. In this manner, substantial parallel processing is possible and achieves a very fast operation. HADOOP systems are widely used in "data analytics" (also known as "Big Data"), social media, and other large enterprise applications. The large block sizes put a heavy burden on the communication channel, however, such that high-speed channels are necessary for performance. Some HADOOP systems suffer from long access times.

In a Big Data HADOOP system, capability expansion is achieved by heaving additional servers and additional memory units. Very often, an update consists mainly of increasing the size of a memory unit of a server, based on a desire to take better advantage of the local computational capability, rather than to further distribute the data.

Many conventional systems (e.g., systems not large enough for HADOOP data structures) also use clustered servers that run software to achieve parallel operations, and backup and recovery methods. Many such systems increase the size of their memory by adding accelerator boards to the processors. To enable data sharing, the accelerator boards communicate over a fast local-area network (LAN) to allow large file transfers, which are time-consuming and intensive in both power and bandwidth. To achieve better file-sharing, an additional layer of software control may be implemented, which may not be desirable in a non-HADOOP type system.

Conventional mass data storage is achieved using hard drives, which have notably slow access times. Even solid-state drives (SSDs) do not qualitatively alleviate the access time bottleneck in many applications. One example of such applications is a server or a cluster of servers running virtual machines (VM). A VM of the prior art is typically scalable. At run time, each instance of the VM is loaded as a separate process from hard disk into memory (e.g., dynamic random-access memory (DRAM)). The process may be swapped out to hard disk or reloaded into memory numerous times during its lifetime, which are very inefficient operations that represent substantial overhead on system performance Recent memory interface standards, e.g., Gen-Z, CXL and CCIX, are developed to specifically address this system performance issue. These standards provide high-speed connections to accelerators for caching, memory buffering and input/output (I/O) expansion.

Social media and Big Data applications require performance that conventional system solutions are inadequate. A method for quickly transferring data from mass storage (e.g., flash memory) to RAM without the communication medium bottleneck (i.e., reduced latency and high through-put) is needed, for example.

SUMMARY

According to one embodiment of the present invention, a memory channel controller for a multi-ported shared memory includes: (a) multiple host interface circuits each configured to receive memory access requests from one or more host processors to the shared memory; (b) a priority circuit which prioritizes the memory access requests to avoid a memory access conflict and which designates each prioritized memory access request to one of the memory ports for carrying out the memory access specified in that prioritized request; (c) a switch circuit; and (d) multiple memory interface circuits, each coupled to an associated one of the memory ports. The switch circuit routes to each memory interface circuit the prioritized memory access requests designated for its associated memory port.

The present invention is better understood upon consideration of the detailed description below in conjunction with the drawings.

BRIEF DESCRIPTION OF THE DRAWINGS

Although the drawings depict numerous examples of the invention, the invention is not limited by the depicted examples. In the drawings, like reference numerals designate like elements. Also, elements in the figures are not necessarily depicted to scale.

DETAILED DESCRIPTION OF THE PREFERRED EMBODIMENTS

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise stated.

The detailed description below is provided along with accompanying figures in connection with examples of the present invention but the invention is not limited by any of the examples. Numerous alternatives, modifications, and equivalents are possible within the scope of the present invention, which is set forth in the claims. For clarity, some technical material that is known in the art has not been described in detail to avoid unnecessarily distracting from the description.

Figure 1:
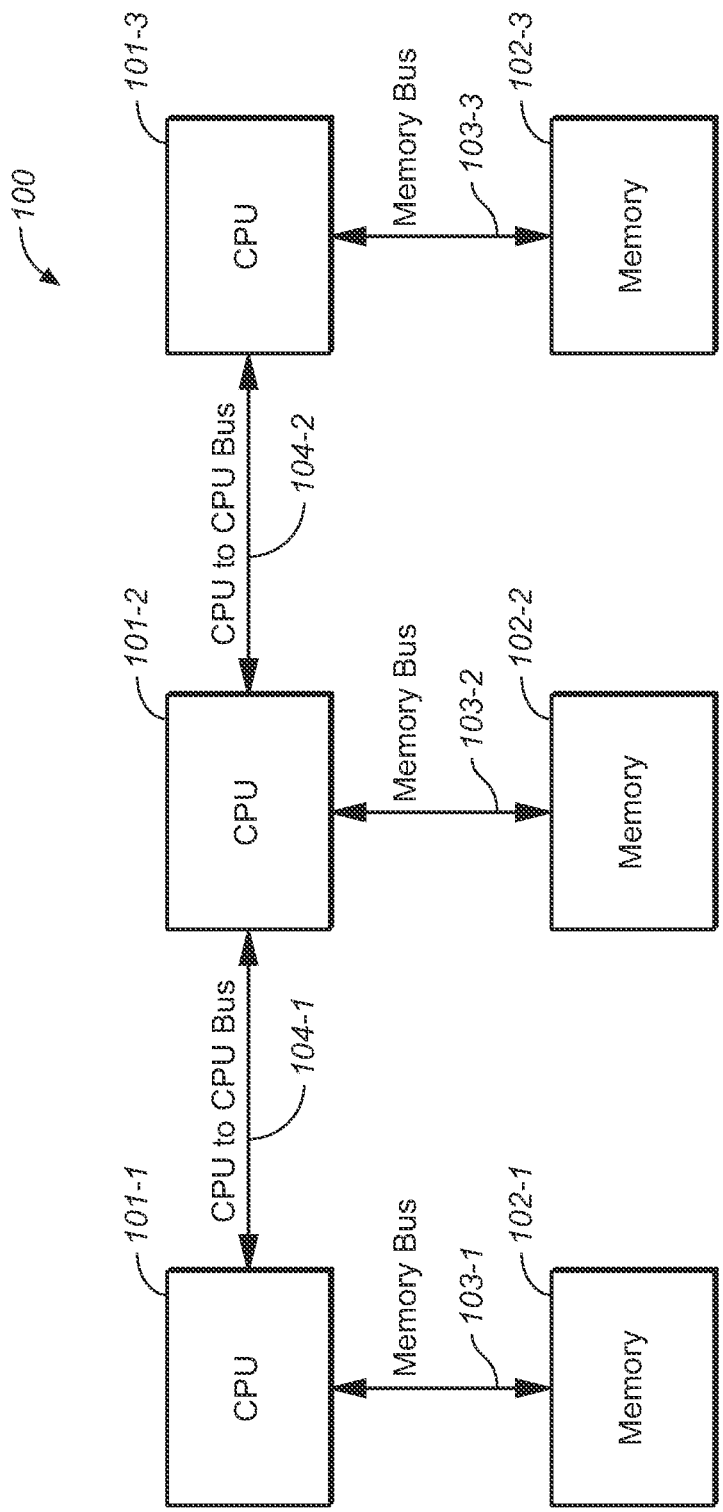
FIG. 1 illustrates an exemplary NUMA memory system.
Figure 2:
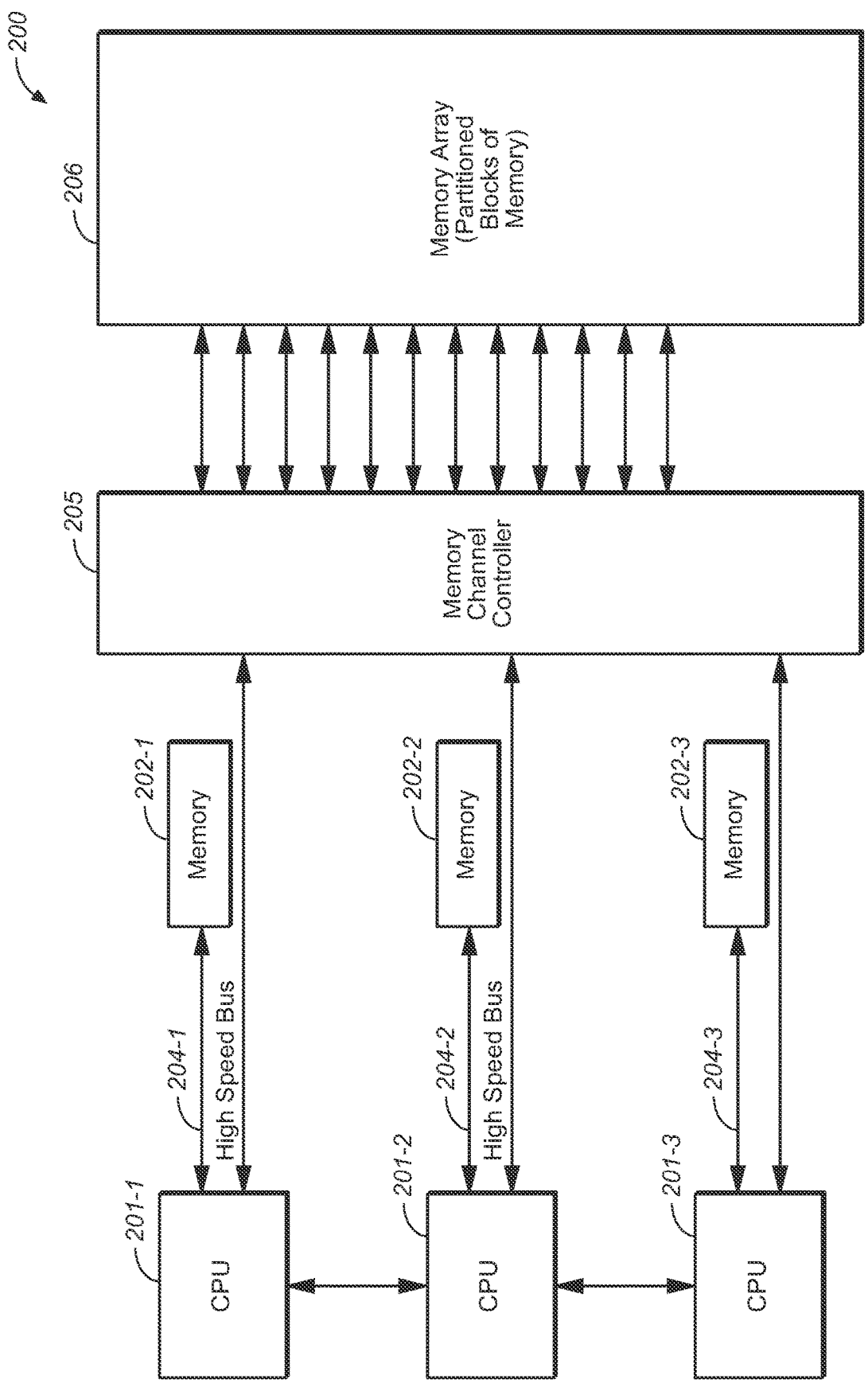
FIG. 2 shows data system 200 that has a shared memory (i.e., shared memory 206) with low operating latency and high throughput, according to one embodiment of the present invention.
Figure 3:
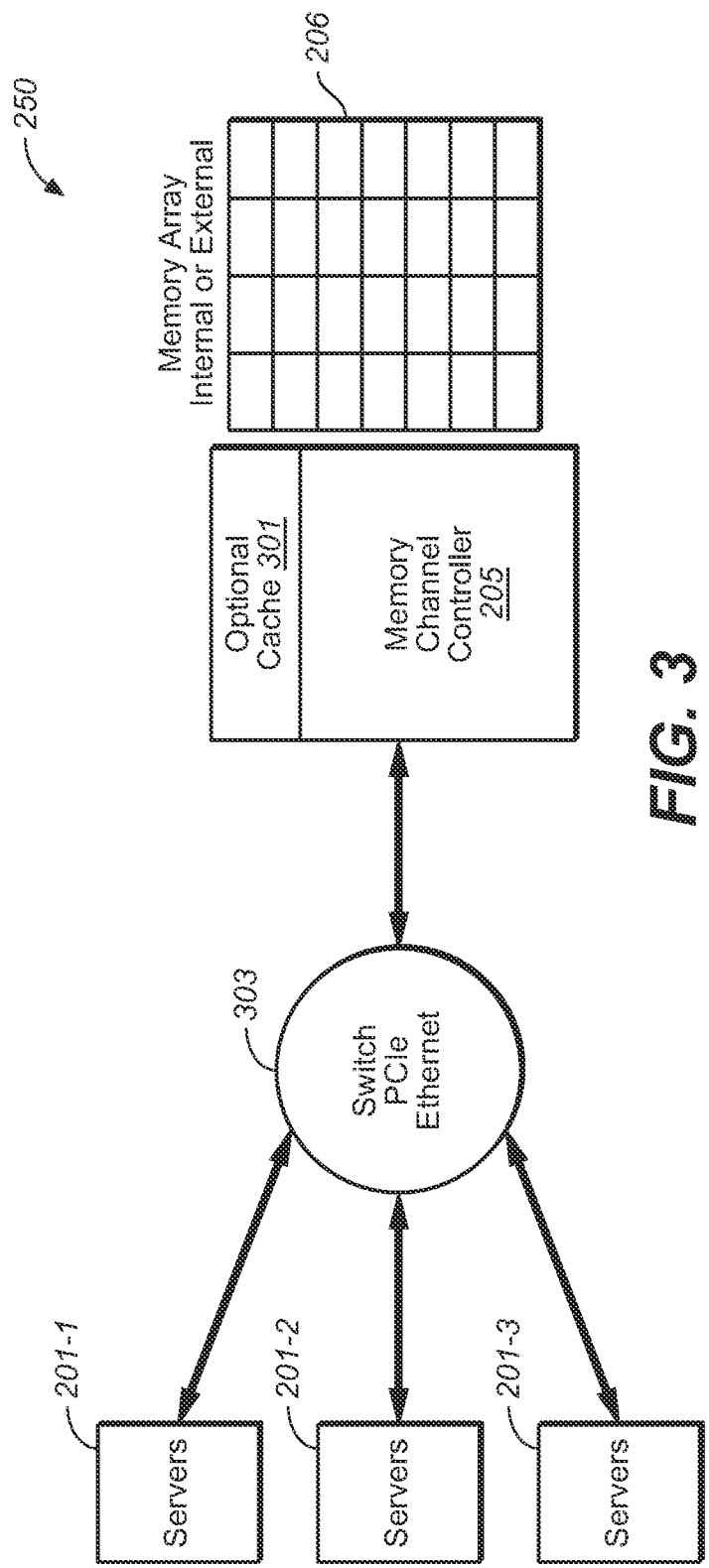
FIG. 3 shows data system 250, which includes cache memory 301, according to one embodiment of the present invention.

According to one embodiment of the present invention, FIG. 2 shows data system 200 that has a shared memory (i.e., shared memory 206) with low operating latency and high throughput. As shown in FIG. 2, data system 200 includes servers 201-1 to 201-3, having respectively, non-shared memories 202-1 to 202-3 directly accessible over memory channels 204-1 to 204-3 (e.g., industry standard memory interface, such as DDR). In addition, servers 201-1 to 201-3 each access shared memory 206 through memory channel controller 205. Shared memory 206 may be implemented by the quasi-volatile (QV) memory and QV memory modules described, for example, in Provisional Applications III, IV and VI. For the purpose of illustration, a QV memory is used as an example of an implementation of shared memory 206. The present invention is, however, not limited to QV memory implementations. FIG. 3 shows data system 250, which includes cache memory 301, according to one embodiment of the present invention. In FIG. 3, servers 201-1 to 201-3 of FIG. 2, together with their respective dedicated memories 202-1 to 202-3, are connected to memory channel controller 205 over local area network 303 (e.g., via switches, ethernet or PCIe). Unlike data system 200, however, data system 250 includes also cache memory 301, which caches data stored in shared memory 206 under memory channel controller 205. Examples of caching of QV memory are described, for example, in Provisional Application V.

Figure 4:
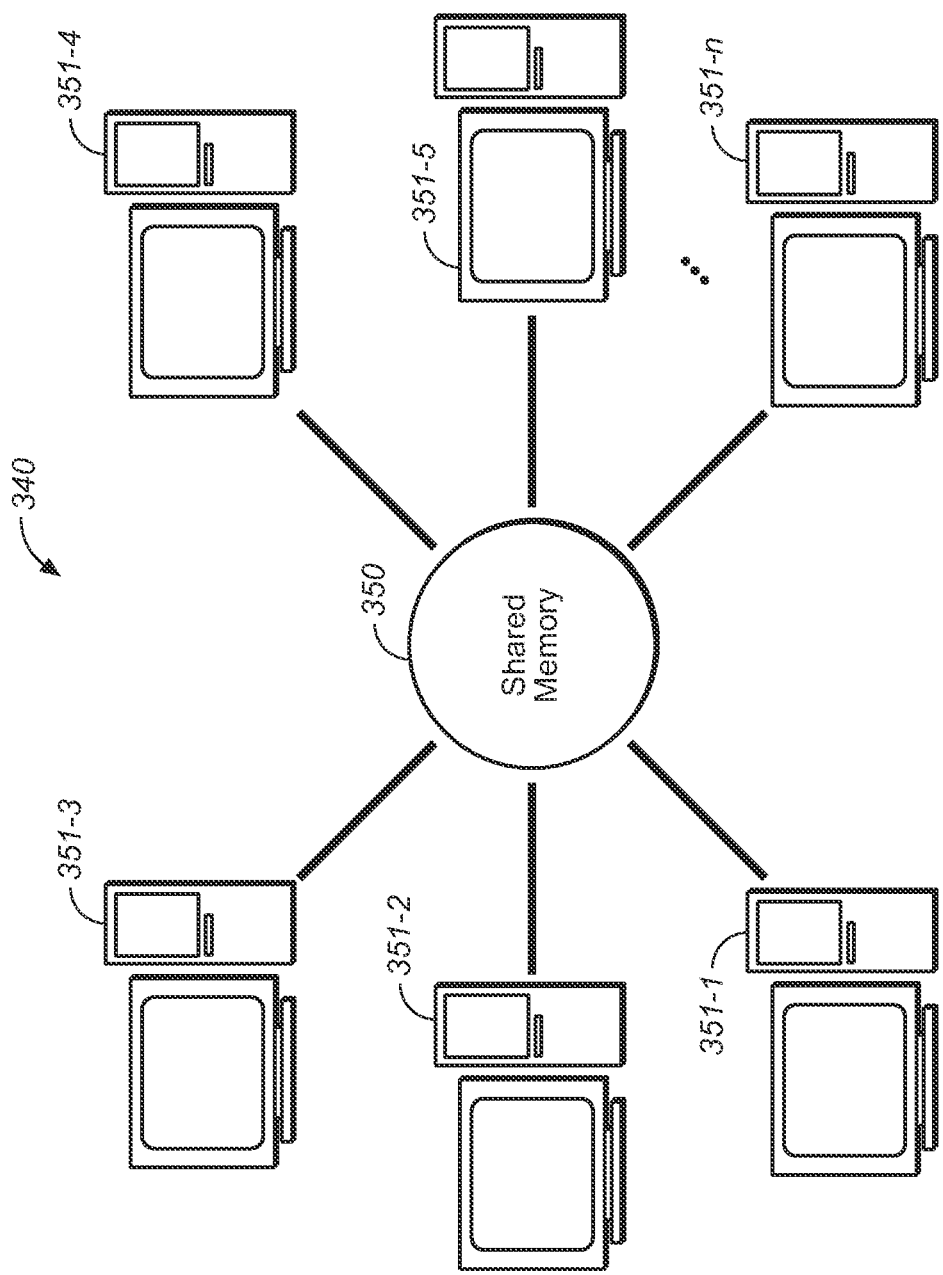
FIG. 4 shows "memory-centric" computer system 340 which allows parallel accesses of shared memory 350 by numerous processors 351-1 to 351-$n$, according to one embodiment of the present invention.

Taking the shared memory systems of FIGS. 2-3 one step further, FIG. 4 shows "memory-centric" computer system 340 which allows parallel accesses of shared memory 350 by numerous processors 351-1 to 351-$n$, according to one embodiment of the present invention. In FIG. 4, servers 351-1 to 351-$n$ each connect directly (e.g., over a processor bus) without an intervening general-purpose switching network (e.g., switching network 303 of FIG. 3) to the shared memory 350. Memory-centric computer system 340 thus avoids switch delays and optimizes memory sharing. Additional examples of memory-centric computer systems are disclosed, for example, in Provisional Application VII.

Figure 5:
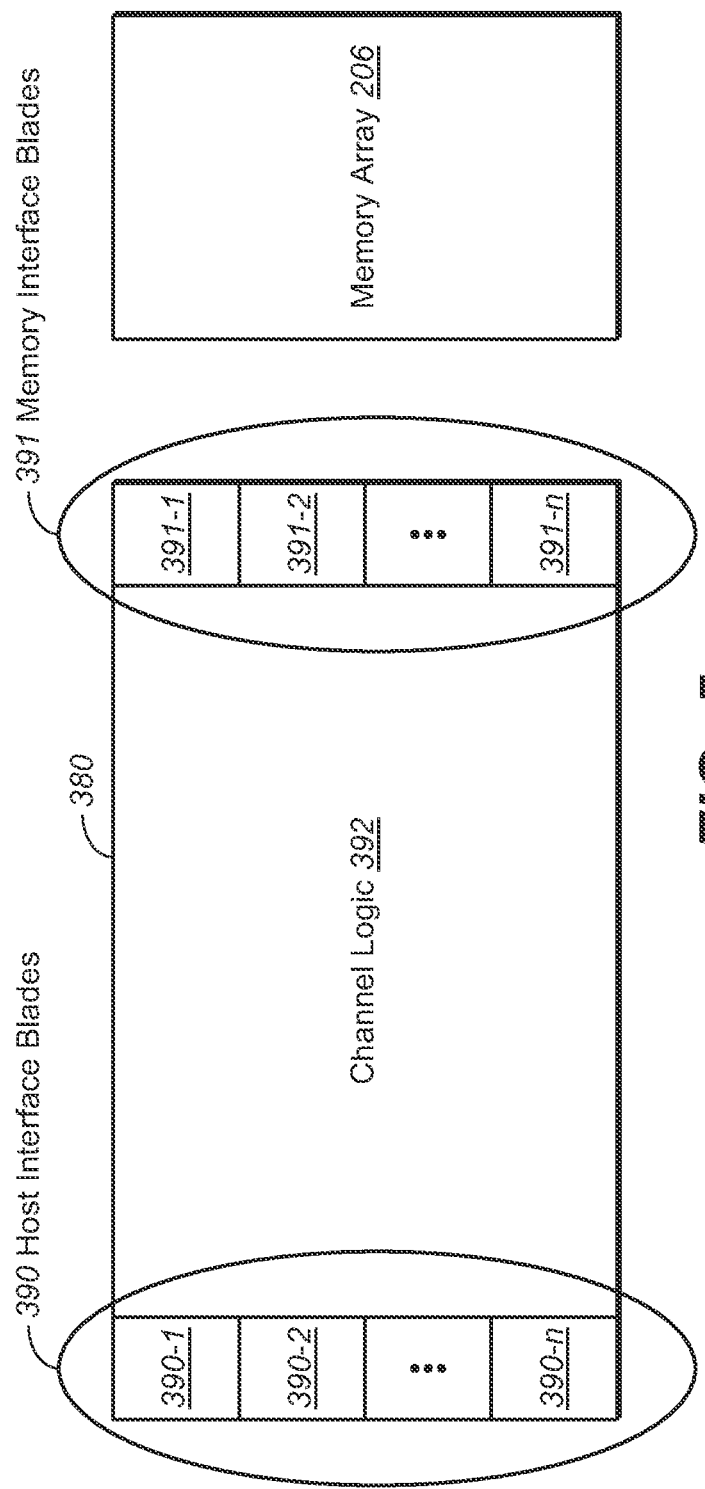
FIG. 5 is a top-level diagram of memory channel controller 380 and memory 206, in accordance with one embodiment of the present invention.

FIG. 5 is a top-level diagram of memory channel controller 380 and memory 206, in accordance with one embodiment of the present invention. As shown in FIG. 5, memory channel controller 380 includes (i) host interface block 390 that includes a number of modular host interface circuits ("host interface blades") 390-1 to 390-$n$, each including an industry standard host interface circuit (e.g., a DDR5 memory interface or a PCIe memory interface), main channel logic circuit 392, and (iii) modular memory interface block 391, which includes memory interface circuits ("memory interface blades") 391-1 to 391-$m$, fan-out to connect various ports of shared memory 206. The module "blade" approach is applicable to both a memory channel controller for tens of terabytes (TBs) that services 2 or 3 servers, and memory channel controller for hundreds of TBs or greater that services 16, 32 or even greater number of host channels. Each memory interface blade may be configured to support any of numerous types of memory ports. In addition, a memory interface blade may support multiple ports to allow parallel access into a high capacity memory (e.g., a QV memory). As each memory port may be restricted for power management reason to communicate with only one memory partition at a time, a fanout of port logic allows accesses to numerous partitions in a large memory array. In that arrangement, only the fanout circuit accessing an active partition need to be powered, while the other fanout circuits may be put in a low-power state.

Solely for illustrative purpose, this detailed description uses as an example a memory channel controller that is accessed by 3 host processors (i.e., servers) and that accesses 5 memory ports of a partitioned QV memory module. A practical implementation (e.g., for a HADOOP Big Data application) may have 16 or 32 host channels and a shared memory of a few terabytes (TB) to hundreds of TB. On one hand, numerous partitions that are relatively small in capacity provide efficiency because of a correspondingly smaller probability of access contentions. On the other hand, the resulting large number of memory channels increases the complexity of memory channel controller 205. The optimal trade-off between partition size and memory channel controller depends on the specific application the memory system is put to.

Figure 6:
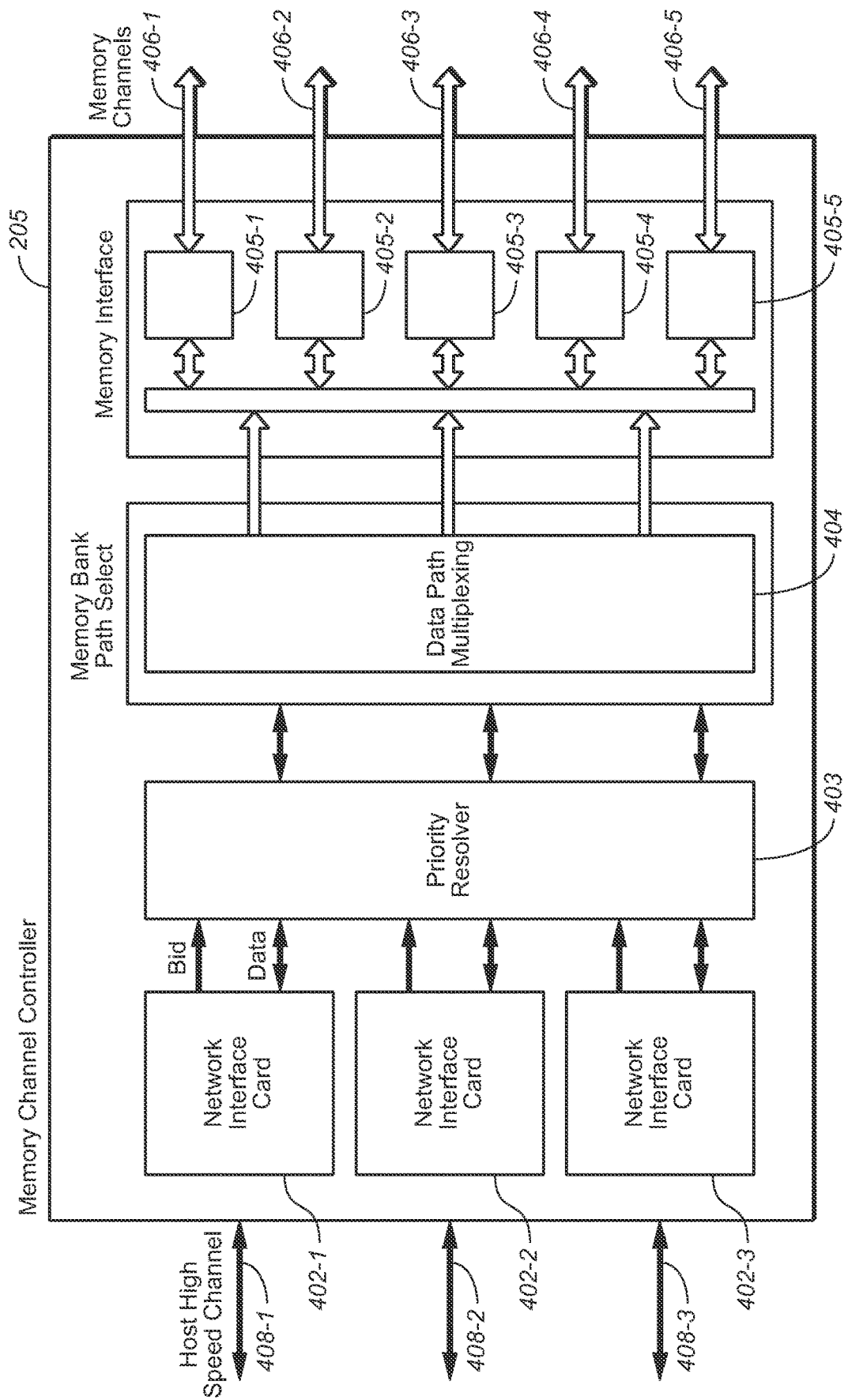
FIG. 6 is a functional block diagram of a hardware implementation of memory channel controller 205, according to one embodiment of the present invention.

FIG. 6 is a functional block diagram of a hardware implementation of memory channel controller 205, according to one embodiment of the present invention. As shown in FIG. 6, a host processor (e.g., servers 201-1 to 201-3) may access memory channel controller 205 over high-speed channels ("host channels") 408-1 to 408-3, which are serviced by network interfaces 402-1 to 402-3, respectively. Priority circuit 403 may prioritize and order concurrent memory requests arriving at the host channels according to a suitable priority scheme (e.g., a quality-of-service scheme). To take advantage of parallelism in memory access, shared memory 206 may be partitioned into numerous independently accessed memory channels each accessible over a dedicated memory interface or port. In the example of FIG. 6, shared memory 206 is partitioned into memory channels 406-1 to 406-5, respectively accessible over memory interfaces 405-1 to 405-5. Memory path select circuit 404 forwards the prioritized memory access requests to be serviced by their corresponding memory channels according to the specified memory addresses.

Under the "memory-centric" approach, each server may directly connect to memory channel controller 205 to access any part of shared memory 206. For example, based on the specified memory address in an incoming memory request and the data in configuration address registers, main channel logic circuit 392 in memory channel controller 205 selects the appropriate memory channel, generates the physical address and submits a corresponding memory access request to the selected memory channel. The memory channel logic circuits handle the different control requirements of the memory channels and their respective timing domains.

Figure 7:
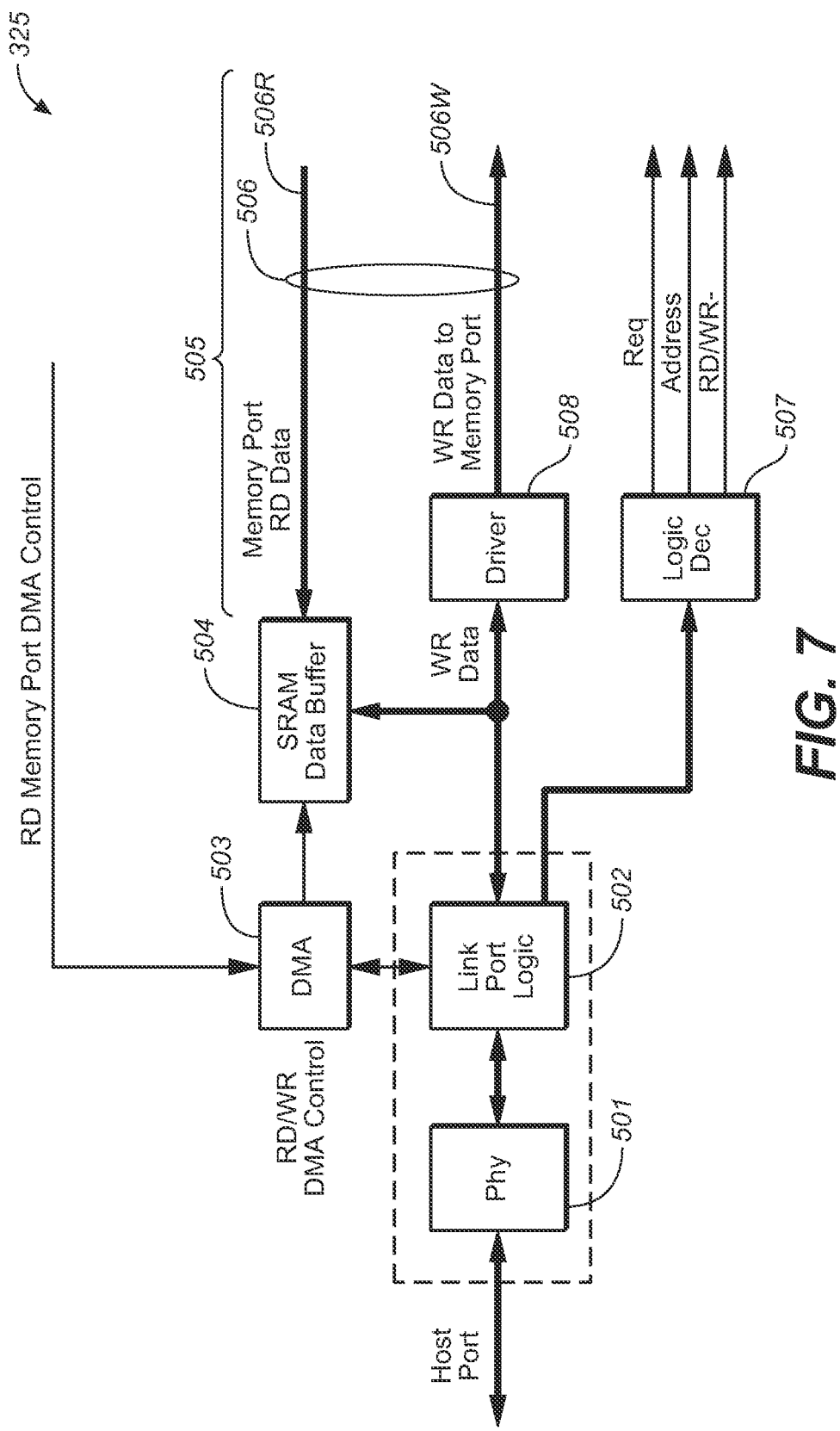
FIG. 7 is a functional block diagram of the operations of host interface circuit 325 in memory channel controller 205, according to one embodiment of the present invention.

FIG. 7 is a functional block diagram of the operations of host interface circuit 325 (e.g., an implementation of any of host interface circuits 390-1 to 390-$n$) in memory channel controller 205, according to one embodiment of the present invention. As shown in FIG. 7, host interface circuit 325 may have (i) a host interface portion, including physical and link layers 501 and 502, providing one or more customary host interfaces to receive memory access requests from one or more host processors; (ii) direct memory access (DMA) circuit 503 and static random-access memory (SRAM) data buffer 504 process the host memory access requests, and (iii) memory port portion 505, including data and control buses 506, respectively, which interfaces with one or more portions of shared memory 206. SRAM data buffer 504 provides high-speed storage for data read from or to be written into shared memory 206. In one embodiment, DMA circuit 503 handles, in additional to conventional host read and write accesses to specified locations in shared memory 206, also data transfers between locations within shared memory 206 (e.g., a copy command) Shared memory 206 may be accessed over one or more memory ports. In one embodiment, shared memory 206 is divided into numerous partitions, with each partition accessible over a dedicated memory port. Memory port portion 505 handles physical data transfers over these memory ports. In one embodiment, each memory port is implemented by a customary industry-standard memory interface (e.g., DDR memory interface). As discussed above, both host interface portion 501 and memory portion 505 may be implemented by modular units (or "blades") which allow incremental system expansion or contraction (e.g., increasing or decreasing the number of host interfaces or port interfaces). In one embodiment, the requested memory access may be specified as a range of memory addresses, such that a large data transfer may be specified in a single memory access request. In that embodiment, memory channel controller 205 may break up the data transfer request into multiple memory access requests each of a smaller address range. The breaking up of the memory access request may be hidden from the requestor.

Figure 8:
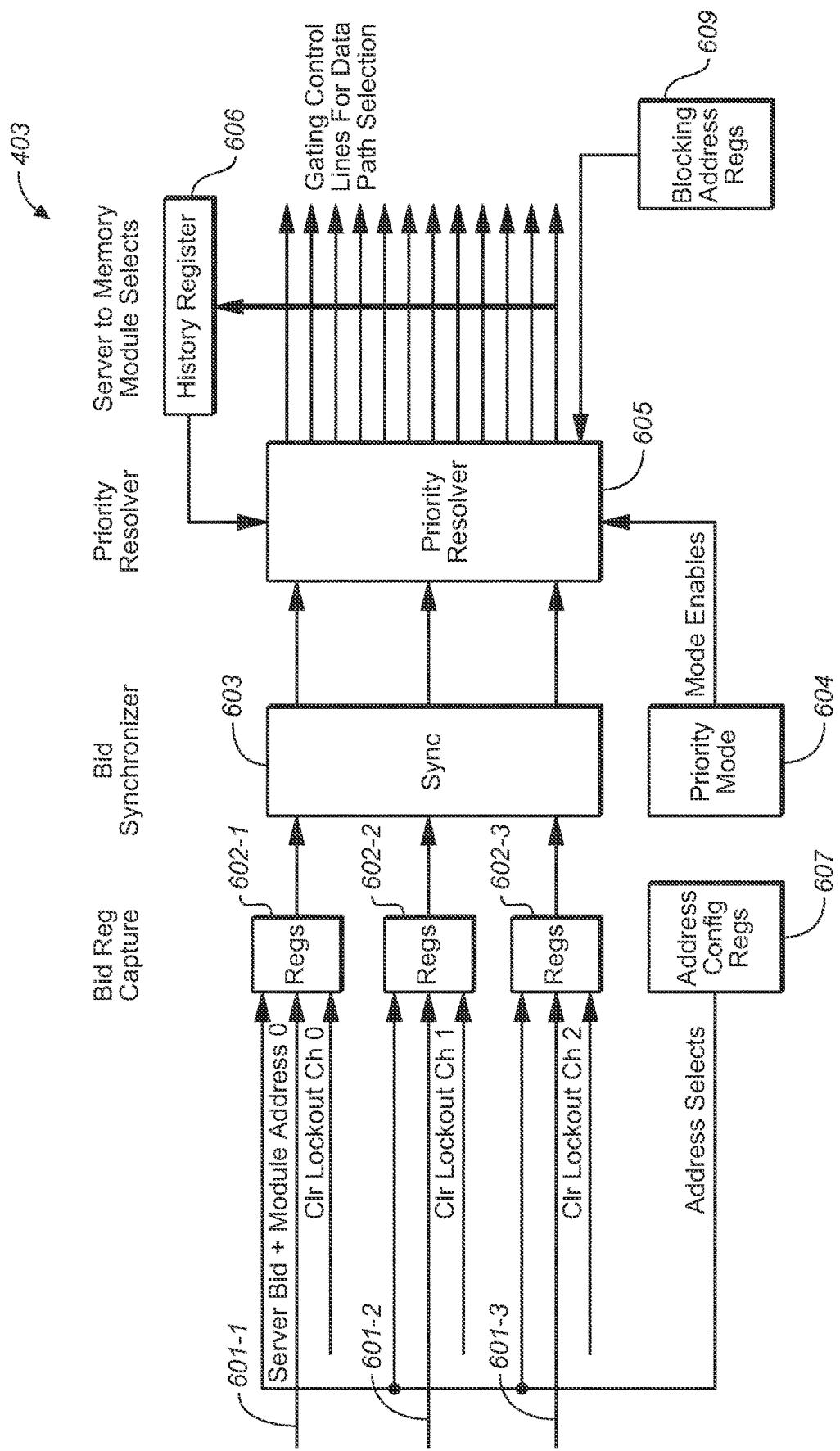
FIG. 8 is a functional block diagram of an implementation of priority circuit 403 (FIG. 6), according to one embodiment of the present invention.

FIG. 8 is a functional block diagram of an implementation of priority circuit 403 of FIG. 6, according to one embodiment of the present invention. As shown in FIG. 8, priority circuit 403 captures into bid registers 602-1 to 602-3 host memory access requests from host channels 408-1 to 408-3 over buses 601-1 to 601-3. Synchronizer 603 synchronizes the memory access requests arriving asynchronously from host channels 408-1 to 408-3 to the clock domain of memory channel controller 205. In the process, synchronizer 603 determines the order of the memory access requests that arrive based on their arrival times, or whether they arrive within a narrow time window to be considered arriving substantially simultaneously.

Priority resolution circuit 605 then issues the memory requests to the memory ports based on a priority scheme that is based on (i) arrival time, (ii) host channel and (iii) specified memory address. The specified memory address is used to determine the memory partition (i.e., memory channel) to which access is requested. In one embodiment, priority resolution circuit 605 allows access requests to different memory partitions to proceed in parallel. When two host channels request access to the same partition, priority resolution circuit 605 allows the memory request that has an earlier arrival time or the one assigned a higher priority to proceed first. When the two memory requests arrive substantially simultaneously, priority resolution circuit allows the memory request of the host channel that has a higher assigned priority to proceed first. When a host channel is granted access to a memory channel, the memory channel is locked out to other host channels. The host thus having exclusive access may relinquish the memory channel when its memory access request is complete to allow the memory channel to be available for bidding. Prior to the memory channel is released from the lockout, further arbitration for that memory channel is disabled.

Priority resolution circuit 605 may also implement an equitable scheme in which the lowest priority host channel can get a minimal amount of access to each memory channel. Priority mode circuit 604 configures priority resolution circuit 605, respectively, a priority scheme (e.g., host channel assigned priorities) and a memory partition map.

The memory access requests issued from priority circuit 403 are converted in memory interface 405 into channel requests to be executed in their corresponding memory channels 406-1 to 406-5 using suitable memory interface protocols and formats. When shared memory 206 is implemented by memories of different memory types with differing signaling protocols, the memory channels may require more than one type of memory interface. These memory interfaces may be implemented by modular units. For example, a memory channel controller may initially be implemented by a memory module having a DDR4 memory interface. In an upgrade, the memory module may be replaced by another memory module that has a DDR5 or an HBM interface. To accommodate such an architecture, memory channel controller 205 has a generic architecture that is generic enough as to be agnostic to a specific memory interface. The same approach is beneficial with respect to the host interface in the host channels.

Address configuration registers 607 may be set at power-up or at installation. The configuration bits in address configuration registers 607 maps the specified address in the memory access request to the address and command structure specific to each memory port and memory request type. For example, many DRAMs are organized as blocks and banks, which are incorporated into the signaling protocols used in their accesses. In a QV memory, memory channel controller 205 may take advantage of its organization, which may include bank groups, banks or tile structures. Description of these features in a QVM may be found, for example, in Provisional Application III-V, incorporated by reference above.

Figure 9:
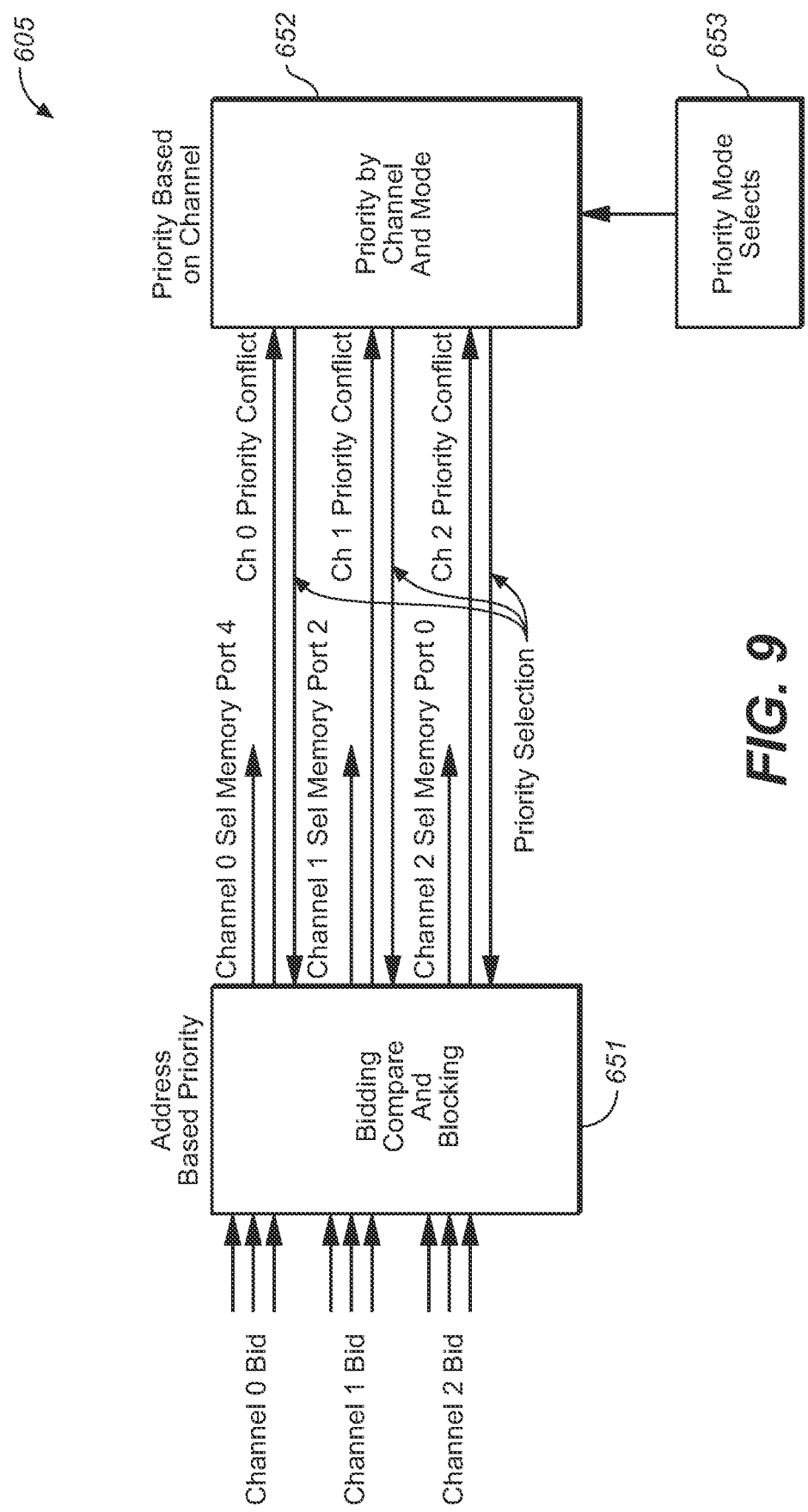
FIG. 9 shows one implementation of priority resolution circuit 605 (FIG. 8), in accordance with one embodiment of the present invention.

FIG. 9 shows one implementation of priority resolution circuit 605 (FIG. 8), in accordance with one embodiment of the present invention. As shown in FIG. 9, synchronized memory access bids from host channels 0, 1 and 2 are received from synchronizer 603 (FIG. 8). Based on the configured address mapping, address-based priority circuit 651 maps each host request to the requested partition or memory channel of shared memory 206. In the example shown in FIG. 9, for simplicity, each memory channel has a single read and write port, so that the identification number of each memory channel also identifies the corresponding memory port. Thus, in this example, a requested memory access by any of host channels 0-2 may be mapped to one of five memory port (i.e., memory ports 0-4). As shown in FIG. 9, the host channel bid is analyzed in address-based priority circuit 651 to determine if an address-based conflict (i.e., two or more access requests to the same partition) exists among the synchronized bids of the host channels. If an address-based conflict is found, the host channels involved in the conflict are identified to channel and mode-based priority circuit 652 to resolve based on the priorities assigned to the host channels and the operation modes configured in priority mode select circuit 653. The priority selection determined by channel and mode-based priority circuit 652 is fed back to the address-based priority circuit 651 to select the winning channel on a bid. In other embodiments, where a memory channel may have more than one memory port, the address-based conflict occurs at the port level. In that instance, locking occurs at the port level and more than one host channels may be granted access to the same memory channel but are granted exclusive accesses to their respective memory ports.

In some embodiments, host channel priorities may be assigned according to a round-robin scheme, in which a ring counter select one of the host channels at a given time, changing the select host channel at a regular interval. Under that scheme, only a selected host channel may request access to a memory channel Some embodiments use a combination of a strict hierarchical scheme and a rotating priority scheme in which a selected group of host channels under the round-robin scheme bid for memory channel access against host channels in another group that are allowed to bid at all times or more frequently.

While a strict hierarchical scheme may result in extreme circumstances some host channels being constantly blocked from requesting memory access. In most applications, the extreme circumstances seldom occur, and a strict hierarchical scheme may be acceptable or even preferred. Returning to FIG. 8, history register 606 captures the memory request grants in a predetermined number of preceding cycles, which allow a more equitable conflict resolution scheme. For example, based on the history stored in history register 606, bidding by host channels that have completed a memory access within a recent predetermined time period may be disabled to allow memory access by other host channels. In this manner, the possibility of complete lock out by higher priority host channels may be avoided.

In some applications, an efficient address-based conflict resolution may be a more significant design parameter than the host channel-based priority scheme. With suitable partitioning, many if not most memory accesses may proceed in parallel.

The priority resolution circuit (e.g., priority resolution circuit 605 of FIG. 8) may be a timing-critical portion of a memory channel controller. For high performance (i.e., high clock-rate operations), implementing the priority resolution circuit (if not the entire memory channel controller) in an application-specific integrated circuit (ASIC) may be preferable. In addition to performance requirement, data security issues may also be handled by the priority resolution circuit. Data security issues arise, for example, when only sensitive data should be accessible only by users over selected privileged host channels. The priority resolution circuit may be configured to support various access control schemes. Such access control scheme may be implemented alongside with partition address mapping. For example, in FIG. 8, blocking address registers 609 may configure address-based priority circuit 651 of FIG. 9 to block access to certain memory resource (e.g., range of addresses) by unauthorized memory requests.

Figure 10:
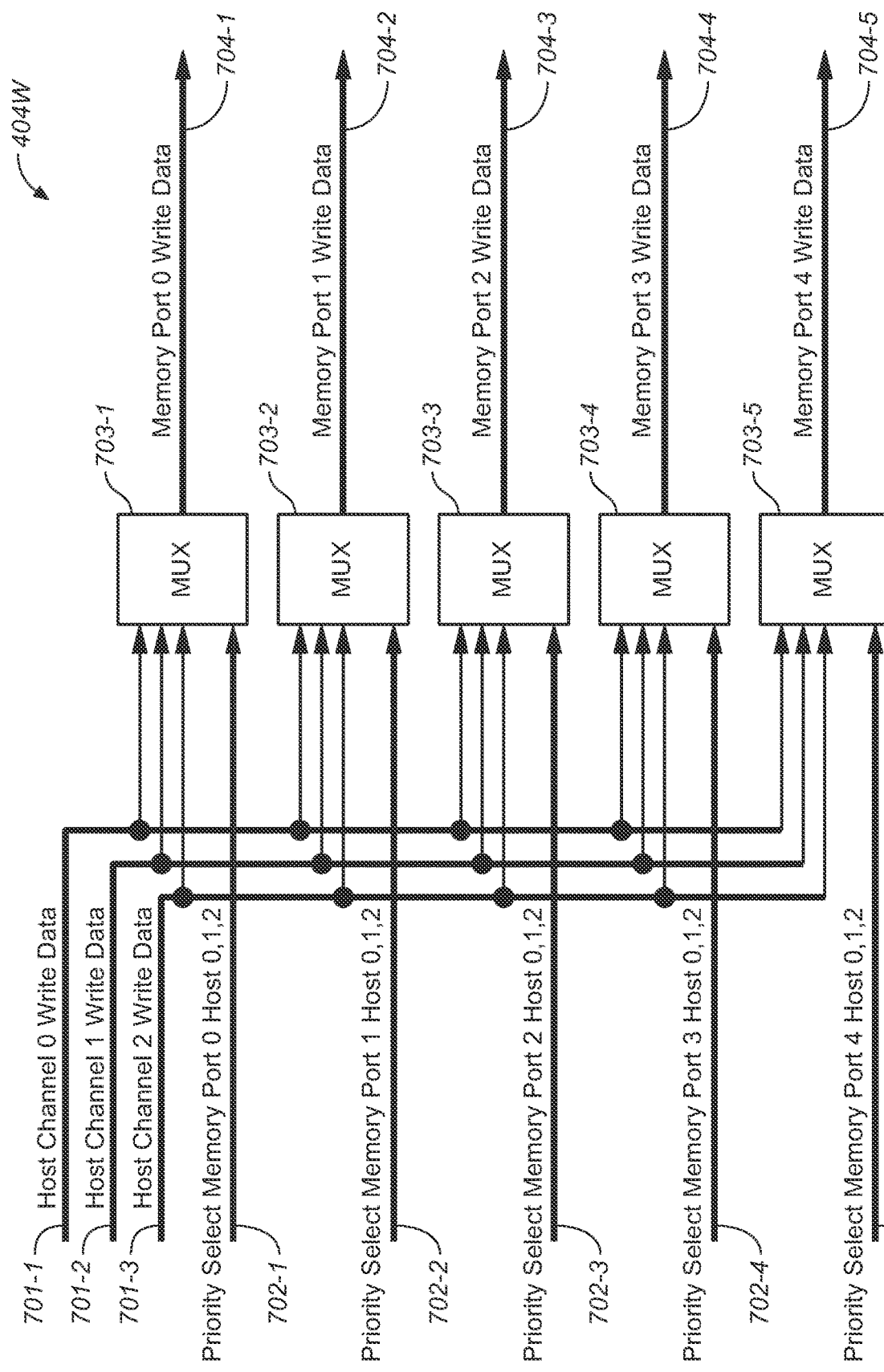
FIG. 10 shows memory path select circuit 404W, which is a portion of memory path selection circuit 404 (FIG. 6) that routes data specified in write memory accesses from the host channels to the memory channels, according to one embodiment of the present invention.

FIG. 10 shows memory path select circuit 404W, which is a portion of memory path selection circuit 404 (FIG. 6) that routes data specified in write memory accesses from the host channels to the memory channels, according to one embodiment of the present invention. Recall in FIG. 7, in each host channel, link layer 502 extracts from physical layer 501 the command and data signals that constitute the memory write request. As mentioned above, memory channel controller 205 also handles other memory access requests, such as a "copy" request. The copy command may be implemented as a series of read accesses from locations corresponding to a range of contiguous source memory addresses, followed by write accesses of the data read to locations corresponding to a range of contiguous destination addresses. In the copy command, however, internal DMA circuit 503 handles generating the read and write accesses. In FIG. 10, each write access may correspond to a host write access or a write access generated internally by DMA circuit 503. As shown in FIG. 10, in memory path select circuit 404W, data to be written into shared memory 206 from the host channels (or generated by the DMA logic) are placed in write data buses 701-1 to 701-3. Priority circuit 403 generates control signals 702-1 to 702-5 to multiplexer circuits 703-1 to 703-5, respectively. Based on these control signals, multiplexer circuits 703-1 and 703-5 each select the data from one of write data buses 701-1 to 701-3 to be placed on a corresponding one of memory channel buses 704-1 to 704-5, which are the data buses for memory channels 406-1 to 406-5. In response to a control signal indicating valid data on its corresponding write data bus 704-1, 704-2, . . . or 704-5, memory channel 406-1, 406-2, . . . , 406-5 begins filling SRAM data buffer 504 in preparation for the write operation into shared memory 206. The write data may be the minimum unit of data (e.g., a cache line or 64-bytes) or any suitable amount of data depending on the partition, which may write a much larger amount of data in each write operation. For example, in a QV memory, each write operation may write one or more 4 K-bit page of data. In a practical implementation, each host channel may have numerous memory requests to different memory partitions pending to take advantage of parallelism.

Figure 11:
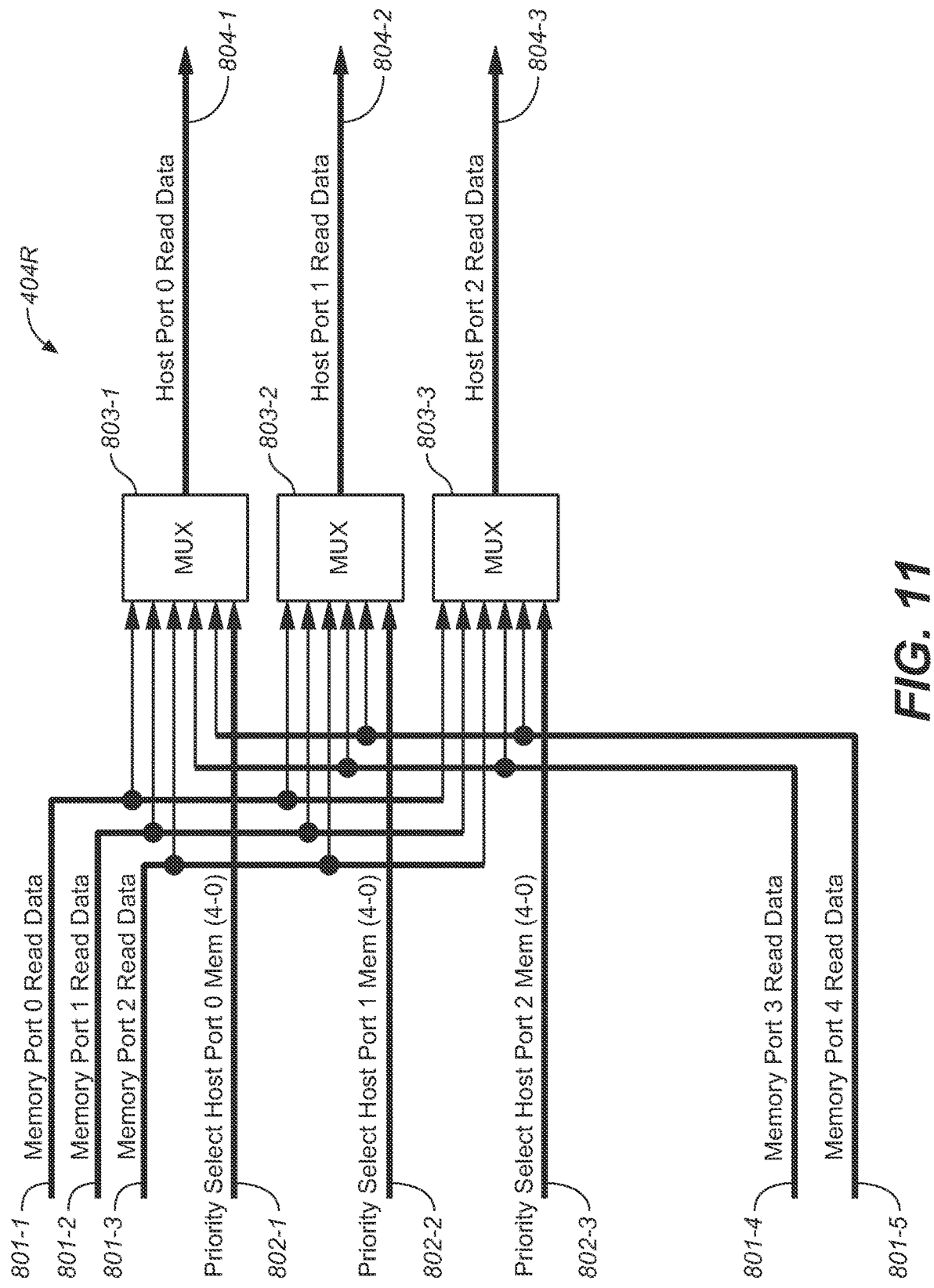
FIG. 11 shows memory path select circuit 404R, which is a portion of memory path select circuit 404 (FIG. 6) that routes data obtained in read memory accesses from the memory channels to the host channels, according to one embodiment of the present invention.

FIG. 11 shows memory path select circuit 404R, which is a portion of memory path select circuit 404 (FIG. 6) that routes data obtained in read memory accesses from the memory channels to the host channels, according to one embodiment of the present invention. Recall in FIG. 7, DMA circuit 503 keeps tracks of each read memory access such that, when the data retrieved from the read memory access becomes ready at the corresponding memory channel and sequentially latched into SRAM data buffer 504, DMA circuit 503 causes the data to be placed on read data buses 801-1 to 801-5 based on a priority scheme. As mentioned above, the copy command may be implemented as a series of read accesses from locations corresponding to a range of contiguous source memory addresses, followed by write accesses of the data read to locations corresponding to a range of contiguous destination addresses. In the copy command, however, internal "direct memory access" (DMA) logic in DMA circuit 503 handles generating the read and write accesses. In FIG. 11, the data on each of read data buses 801-1 to 801-5 may correspond to a host read access or a read access generated internally by DMA circuit 503. Control signals 802-1 to 802-3 generated by priority circuit 403 select the data on buses 801-1 to 801-5 to be provided on multiplexer circuits 803-1 to 803-3 to output data buses 804-1 to 804-3 to be provided to host channels 408-1 to 408-3, respectively. The read data may be the minimum unit of data (e.g., a cache line or 64-bytes) or any suitable amount of data depending on the partition, which may provide a much larger amount of data (e.g., a 4K-bit page) simultaneously in response to each read operation.

Figure 12:
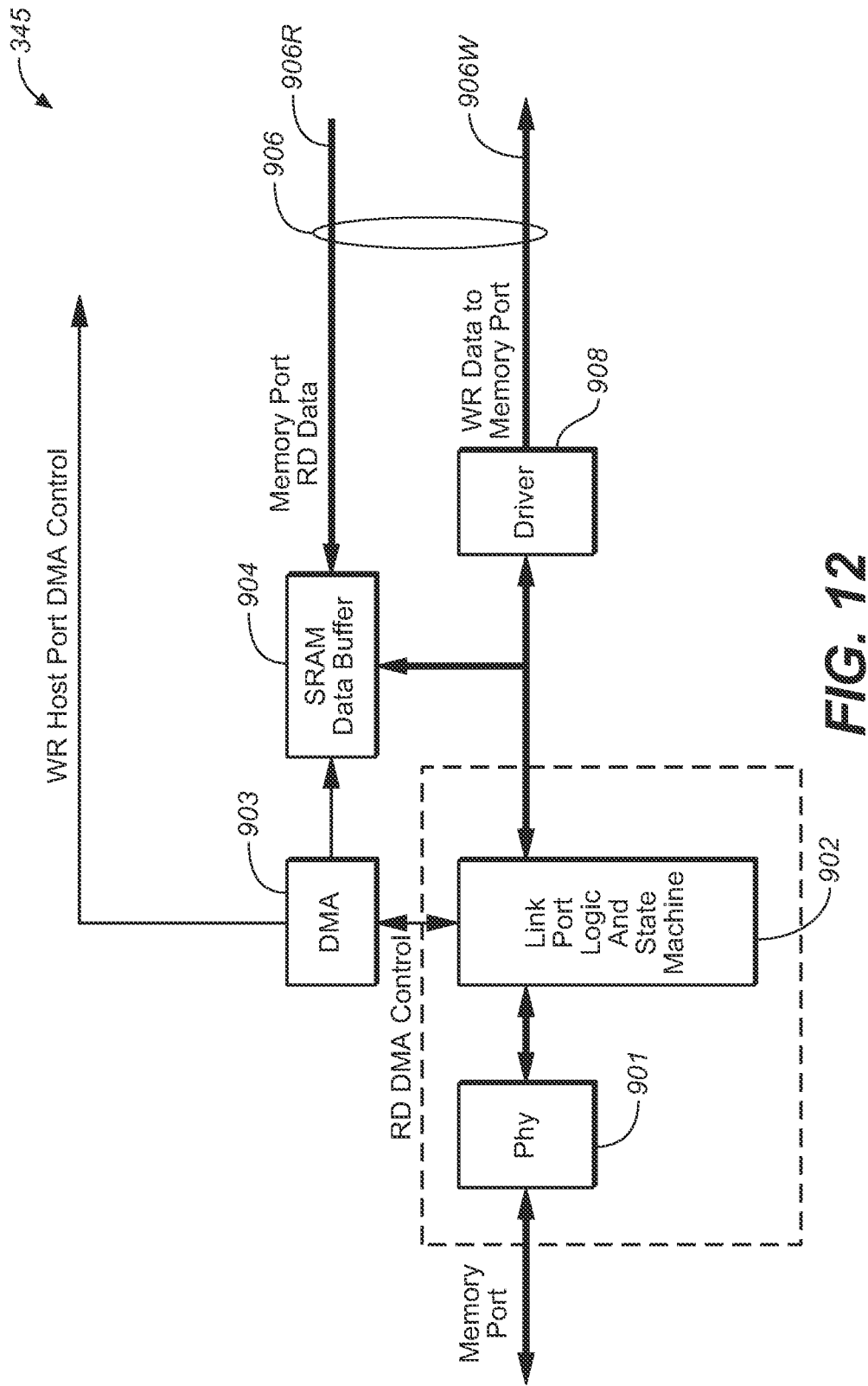
FIG. 12 is a functional block diagram of the operations of memory interface circuit 345 (e.g., an implementation of any of memory interface circuits 391-1 to 391-$m$ of FIG. 5) in memory channel controller 205, having a single memory port, according to one embodiment of the present invention.

FIG. 12 is a functional block diagram of the operations of memory interface circuit 345 (e.g., an implementation of any of memory interface circuits 391-1 to 391-$m$ of FIG. 5) in memory channel controller 205, having a single memory port, according to one embodiment of the present invention. As shown in FIG. 12, memory interface circuit 345 may have (i) host-side interface portion, including physical and link layers 901 and 902, which arbitrated memory access requests from host path select circuit 404; (ii) DMA circuit 903 and SRAM data buffer 904 process the memory access requests, and (iii) memory-side portion, which includes data buses 906, including read data bus 906R and write data bus 906W. Data bus 906 holds the read and write data of the memory channel (e.g., any of memory channels 406-1 to 406-$m$ of FIG. 6) accessing its associated partition of shared memory 206. SRAM data buffer 904 provides high-speed storage for data read from or to be written into central shared memory 206. Drivers 908 place the data on write data bus 906W to be written into the associated partition. In one embodiment, DMA logic circuit 903 handles, in additional to conventional host read and write accesses to specified locations to the associated partition of shared memory 206, also data transfers between locations within the associated partition (e.g., a copy command) The control and data signals in the memory-side portion may conform to a customary industry-standard memory interface (e.g., DDR memory interface).

In the current example, DMA circuits are present in both a host interface circuit (e.g., DMA circuit 503 of FIG. 7) and a memory interface circuit (e.g., DMA circuit 903 of FIG. 12). These DMA circuits cooperate to allow, for example, data transfers without host intervention within and across partitions of shared memory 206. In other examples, DMA circuits may be provided only in the host interface circuits or only in the memory interface circuits.

Figure 13:
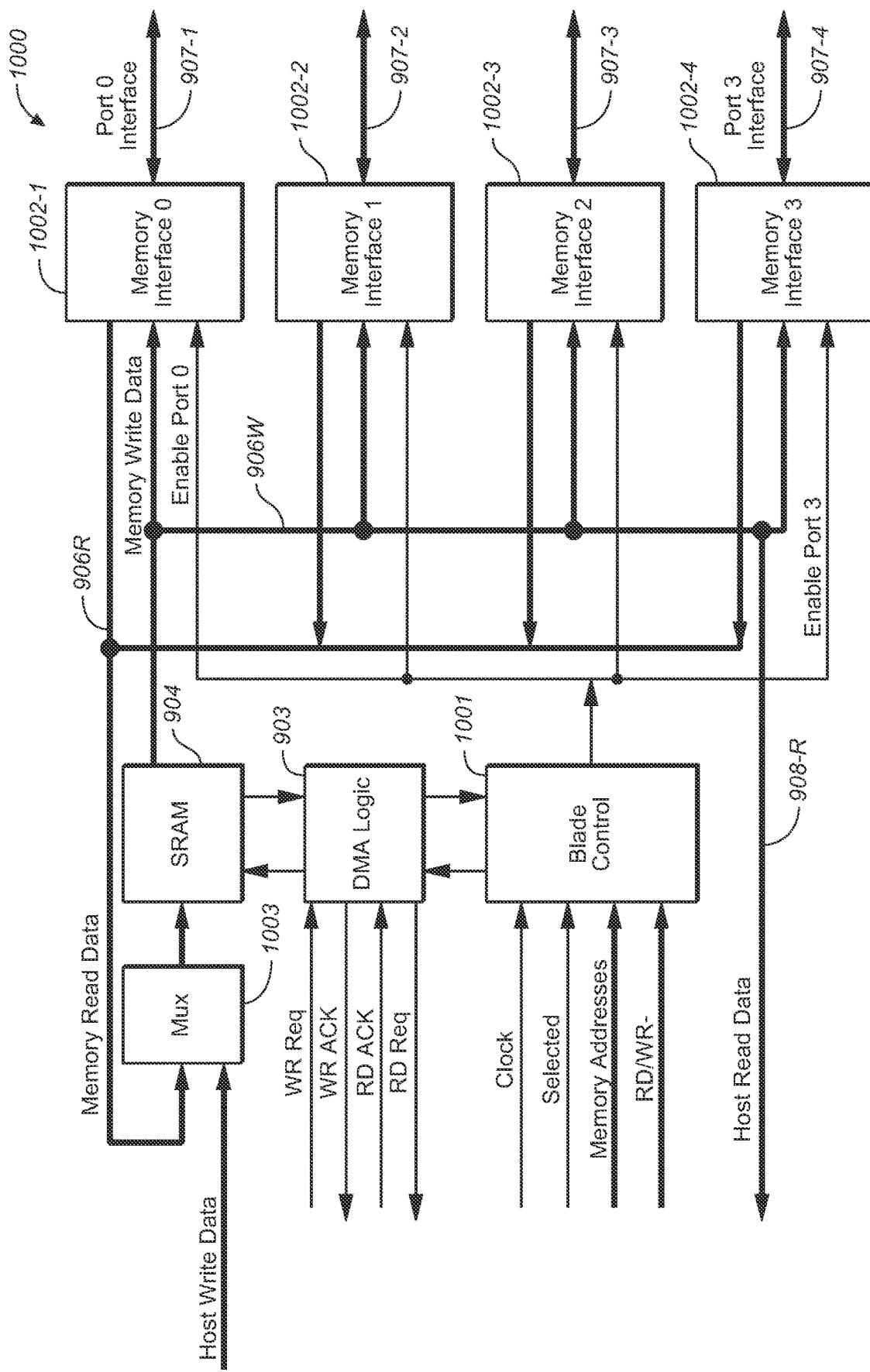
FIG. 13 is a functional block diagram of the operations of memory interface circuit 1000 (e.g., an implementation of any of memory interface circuits 391-1 to 391-$m$ of FIG. 5) in memory channel controller 205, having memory ports 1002-1 to 1002-4, according to one embodiment of the present invention.

FIG. 13 is a functional block diagram of the operations of memory interface circuit 1000 (e.g., an implementation of any of memory interface circuits 391-1 to 391-*m* of FIG. 5) in memory channel controller 205, having memory ports 1002-1 to 1002-4, according to one embodiment of the present invention. Memory interface circuit 1000 may be, for example, a modular memory interface blade. Unlike single-port memory interface circuit 345 of FIG. 12, memory interface circuit 1000 includes port interfaces 1002-1 to 1002-4 with shared memory 206. Control logic circuit 1001 controls sharing read data bus 906R and write data bus 906W among port data buses 907-1 to 907-4. Based on the memory address associated with a memory request, control logic circuit 1001 determines both whether the memory request maps to a memory channel it handles and, if so, which of port interfaces 907-1 to 907-4 is to be used. As mention above, for power efficient, a port interface not involved in an active memory access request may be put in a low-power state. Multiplexer 1003 selects for storage into SRAM 904 write data received from host or read data retrieved from shared memory 206 over port interfaces 1002-1 to 1002-4. The read data retrieved from shared memory 206 are retrieved from SRAM 904 and provided on read data bus 908R for one of host interface circuits (e.g., host interface circuit 325 of FIG. 7) for delivery to the host channel requesting the memory access.

Figure 14:
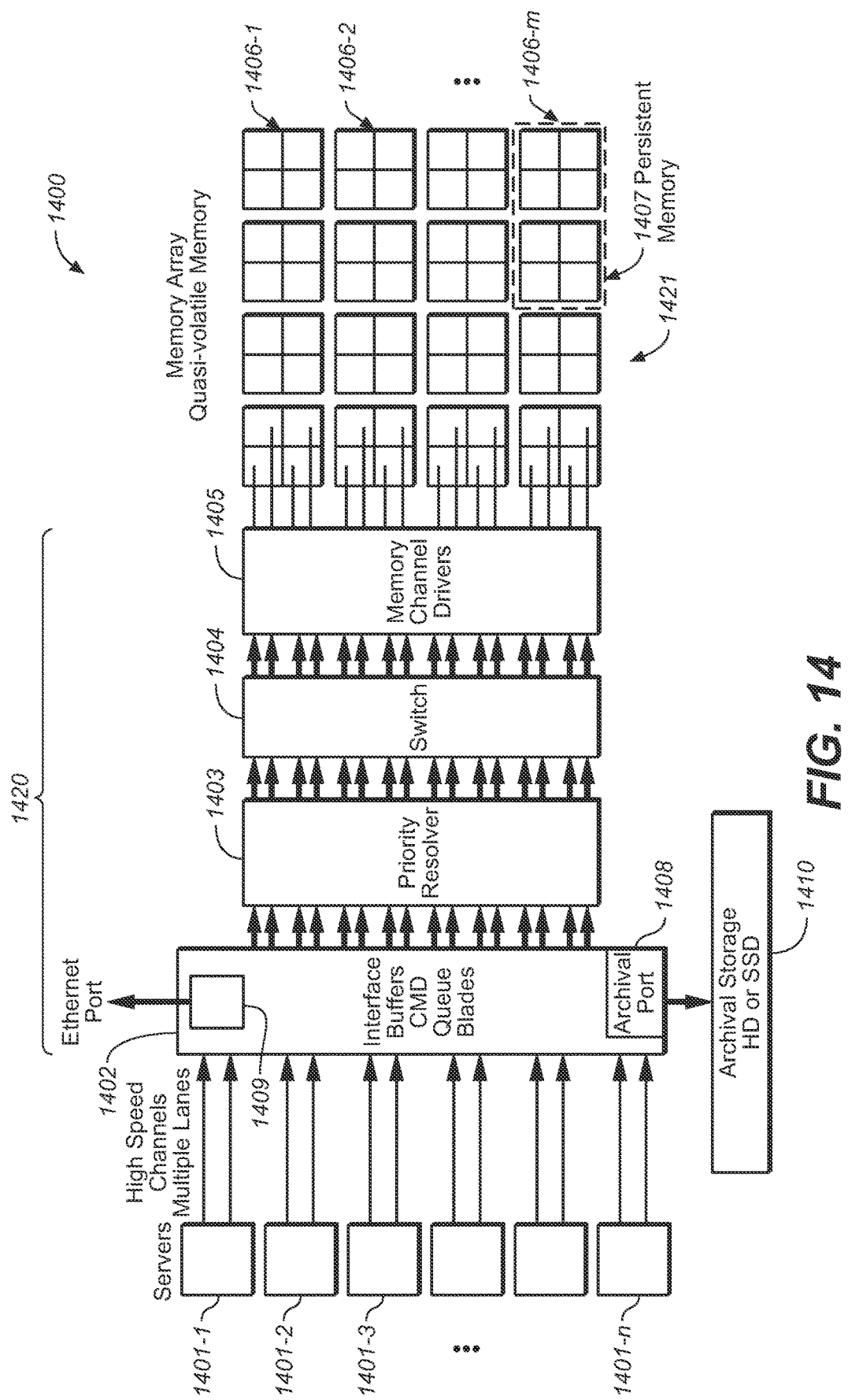
FIG. 14 is a functional block diagram of shared memory system 1400, including servers 1401-1 to 1401-$n$ and memory channel controller 1420, which is connected to shared memory 1421, in accordance with one embodiment of the present invention.

FIG. 14 is a functional block diagram of shared memory system 1400, including servers 1401-1 to 1401-*n* and memory channel controller 1420, which is connected to shared memory 1421, in accordance with one embodiment of the present invention. Shared memory 1421 may be implemented by modular memory units, illustrated herein by numerous memory modules 1406-1 to 1406-*m*, each of which may be implemented by the QV memory modules (or QV DIMMs) that are disclosed in Provisional Applications IV and VI. As shown in FIG. 14, servers 1401-1 to 1401-*n* each send memory access requests to memory channel controller 1420 as host processors. Memory channel controller 1420 operate in substantially the same manner as memory channel controller 205, described above. For example, host interface circuit 1402 operates in substantially the same manner as host interface circuit 325 (FIG. 7), priority resolution circuit 1403 operates substantially in the same manner as priority resolution circuit 403 (FIG. 8), switch 1404 operates substantially in the same manner as memory path selection circuits 404W and 404R (FIGS. 10 and 11, respectively), and memory interface circuit 1405 operate in substantially the same manner as memory interface circuit 1000 (FIG. 13). For example, priority resolution circuit 1403 resolves priority based on the assigned priority of the channel or based on weighted history. Shared memory 1421 includes a persistent portion 1407 (e.g., flash or another non-volatile storage device), which can be managed by memory channel controller 1420 in a conventional manner. For some applications, host interface circuit 1402 may include a command queue that allows pending memory access requests to be queued. Such pending memory access request may include, for example, memory access requests blocked because of a memory access conflict, or memory access requests that have not been completed or have been reported to the requesting host processors.

For some applications, data buffers (e.g., SRAM buffers) may be optimized for large data packets, and the DMA circuits may support remote direct memory access (RDMA) transfers. In addition, host interface circuit 1402 also includes archival port 1408 and network port 1409. Archival port 1408 allows memory channel controller 1420 to boot from storage device 1410 (e.g., a high-speed hard disk drive or a solid-state disk drive), to store data to the storage device, or to transfer data among the storage device, shared memory 1421, and an external device (e.g., any of servers 1401-1 to 1401-*n*, or another device over network port 1409).

Archival port 1408 may be a PCIe port. Memory channel controller 1420 may log data write activities and updates to the storage device to provide a reliable data back-up and recovery by replay. Through archival port 1408, memory channel controller 1420 enables data transfers between the storage device and shared memory 1421 without intervention by servers 1401-1 to 1401-*n*, thus providing both performance and power efficiency. Each of servers 1401-1 to 1401-*n* may provide a high-level command that enables such transfers over archival port 1408. Archival port 1408 also performs conventional disk integrity tasks (e.g., encryption and RAID error encoding) under control by memory channel controller 1420.

Network port 1409 (e.g., an ethernet port to a local area network or wide area network) allows access to shared memory 1421 from anywhere on the network. For example, network port 1409 may handle connections to a server cluster (e.g., as is customary in a Hadoop system), offering the server cluster a shared large-capacity memory bank. Network port 1409 may also provide automatic remote backup to another system without involvement by servers 1401-1 to 1401-*n*. Through network port 1409, memory channel controller 1420 may act as a web server. In some embodiments, network port 1409 may include data packet buffers and high speed command queue that supports RDMA transfers.

Figure 15:
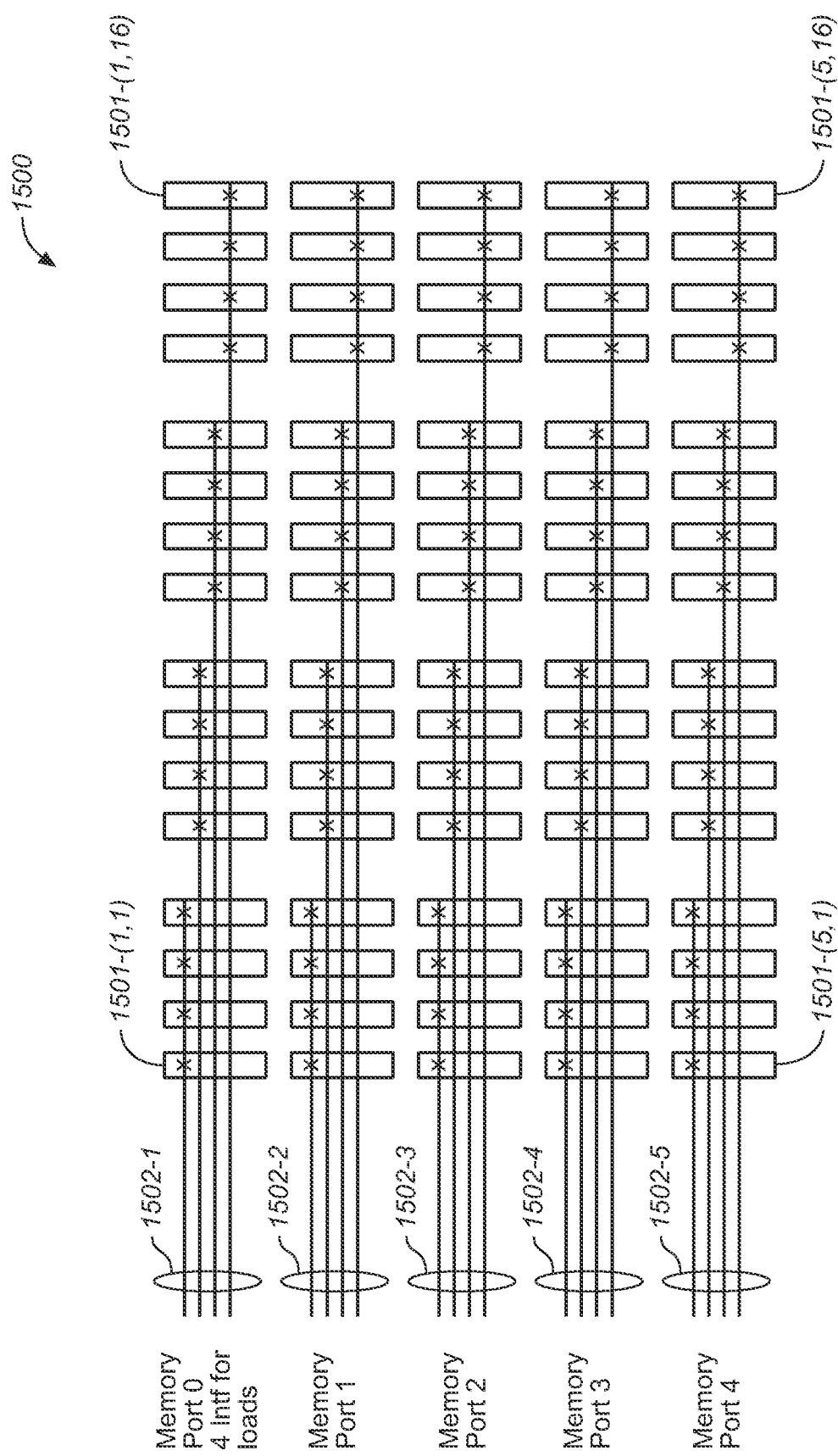
FIG. 15 illustrates one implementation of a memory array in shared memory 1421 (FIG. 14) formed by 5×16 array 1501 of memory devices, labeled 1501-(1,1) to 1501-(5,16), according to one embodiment of the present invention.

FIG. 15 illustrates one implementation of memory array 1500 in shared memory 1421 (FIG. 14) formed by 5×16 array 1501 of memory devices, labeled 1501-(1, 1) to 1501-(5, 16), according to one embodiment of the present invention. Each of memory devices 1501-(1, 1) to 1501-(5, 16) may be, for example, a QV DIMM. As shown in FIG. 15, memory array 1500 is organized as five partitions, each partition consisting of a 16-DIMM row, with each row organized as four 4-DIMM groups. Thus, the five partitions of memory array 1500 may be accessed from memory ports 1502-1 to 1502-5, each with a fanout of 4, thus allowing simultaneous access by each memory port to data in four 4-DIMM groups. Using 256-Gb QV DIMMs, each memory port in memory array 1500 accesses 4 TB of memory.

In the present example, each memory device 1501 is a QV DIMM built using 256-Gb QV memory dies. Each DIMM includes 8 QV memory dies so that the QV DIMM has 256 GB (giga-bytes) of memory. Each DIMM group includes four QV DIMMs. Therefore, each DIMM group has 1 TB (tera bytes) of memory. Each partition consists of a row of 4 DIMM groups for a total 16 DIMMs. Thus, each partition or each DIMM row has 4 TB of memory. The memory array 1500 includes 5 DIMM rows and thus the memory array 1500 can have 20 TB of memory.

Figure 16:
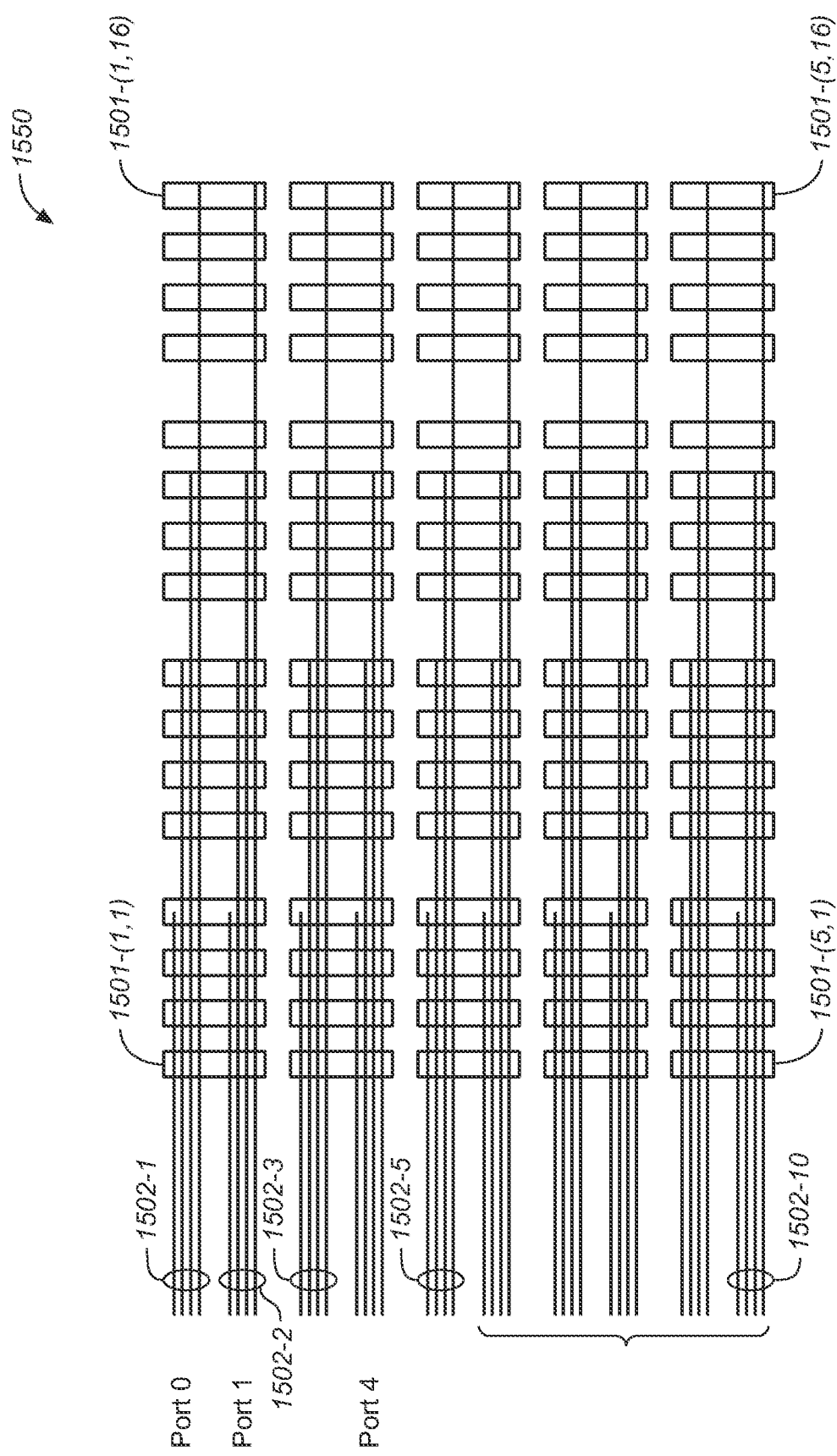
FIG. 16 illustrates memory array 1550, which is an alternative implementation of memory array 1500 of FIG. 15, according to one embodiment of the present invention.

FIG. 16 illustrates memory array 1550, which is an alternative implementation of memory array 1500 of FIG. 15, according to one embodiment of the present invention. Unlike memory array 1500, each 4-TB row of QV DIMMs in memory array 1550 are accessed from two of memory ports 1502-1 to 1502-10, so that each memory port accesses 2 TB of memory. With this arrangement, address-based memory access conflicts may be reduced relative to memory array 1500. With twice the number of memory ports, twice the number of simultaneous memory accesses are possible.

In the present example, the memory array 1550 is constructed in a similar manner as memory array 1500 of FIG. 15. For example, each memory device 1501 is a QV DIMM built using 256-Gb QV memory dies. Each DIMM includes 8 QV memory dies so that the QV DIMM has 256 GB (giga-bytes) of memory. Each DIMM group includes 4 QV DIMMs of 1 TB of memory. Each DIMM row includes 16 QV DIMMS of 4 TB of memory. The memory array 1550 includes 20 TB of memory. In the example of FIG. 16, there are two channels or memory ports accessing each QV DIMM, with each channel accessing half (128 Gb) of the DIMM memory. Accordingly, each DIMM Row of 4 TB is divided into 2 groups to be accessed by the two memory ports. Thus, each memory port controls 2 TB of memory on each DIMM row. By using two memory ports to access each DIMM row, additional granularity is introduced to increase simultaneous memory accesses.

Figure 17:
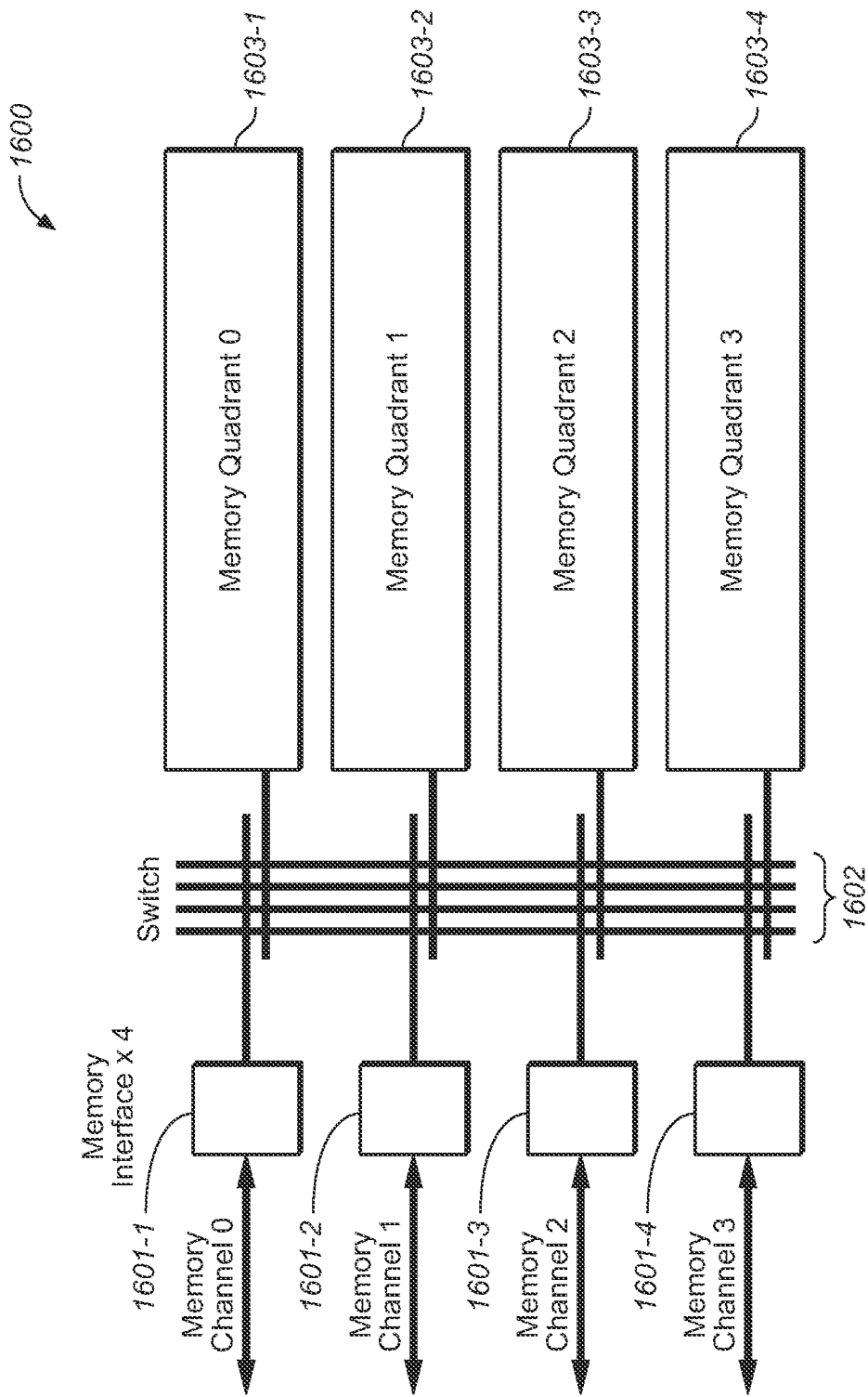
FIG. 17 shows shared memory 1600 in which large-capacity memory array 1603 is partitioned into four quadrants 1603-1 to 1603-4, according to one embodiment of the present invention.

FIG. 17 shows shared memory 1600 in which large-capacity memory array 1603 is partitioned into four quadrants 1603-1 to 1603-4, according to one embodiment of the present invention. Memory array 1603 may be accessed from any of memory ports 1601-1 to 1601-4 through switch circuit 1602. Shared memories with switch circuits that allow access from any of multiple memory ports are disclosed in Provisional Application VII. Under the architecture of shared memory 1600, each memory port can access the memory array 1603 so long as it is not in an address-based conflict (i.e., accessing a partition or quadrant that is also simultaneously accessed by another memory port). A memory channel controller (not shown) resolves such address-based conflict using, for example, priority resolution techniques described above. With a suitable partition scheme (e.g., relatively small partitions), a lower probability of address-based conflicts may be achieved, providing higher performance from more instances of parallel accesses which may proceed. In a shared memory with multiple memory ports, the total capacity of the memory may be divided into blocks based on the number memory ports. While each block may be further partitioned, the memory channel controller allows only one port to access the partitions within the block. Such an organization allows mapping from a virtual address partitioning scheme that is not previously possible at the memory controller level.

In some instances, where address-based conflicts cannot be completely avoided, memory accesses by multiple ports attempting to access the same memory partition may be detected at switch circuit 1602 in shared memory 1600. In the event of detection of such a conflict, an error signal may be generated to initiate recovery actions in the memory interface circuits of the conflict memory ports. In some embodiment, an arbitration (e.g., using a channel-based priority scheme) may determine which of the conflicting accesses may be allowed to proceed. In that case, recovery action need only be taken at the losing memory port. A simple arbitration may be based, for example, which memory request arrives first. The recovery action for losing the arbitration may be resubmission of the memory access later. A wait or queuing mechanism may be provided for resubmission timing efficiency. When a conflict arises and the error signal is activated for all ports attempting similar access, the error signal will stay active until the winning port is done. A dynamically adjusted priority scheme avoids any memory port from being shut out over an extended period.

As discussed in Provisional Applications IV and VI, a memory module may include multiple memory dies stacked on top one over another and over a controller die. The controller die may have multiple memory ports formed on it to allow parallel accesses to the memory dies in the memory module. Thus, such a memory module has a very efficient footprint but a large capacity. Even higher densities can be achieved by interconnecting a number of such memory modules over an interposer substrate.

A memory channel controller of the present invention may also include, for example, error detection and correction circuits, a diagnostic port to allow access to configuration and other registers, error logging circuits, for monitoring and probing device integrity, and circuits for dynamically mapping and removal of defective memory elements in the shared memory. Memory interface circuits (e.g., memory interface circuits 405-1 to 405-5 of FIG. 6) may interface with high-speed buses (e.g., ethernet, PCIe, CXL InfiniBand, Gen-Z, or other industry-standard buses). Such memory interface circuits—which are packet-based and thus do not require a deterministic timing—provide flexibility in managing internal memory operations (e.g., refresh). For example, a memory channel controller may take advantage of a timing difference between a write operation (which is longer) than a read operation to perform refresh operations to a partition locked out for a write operation.

The same type of memory interface circuits may also be used in a host interface. By assigning a suitable priority to each host interface or channel, a server may have access to a high-capacity memory or a virtual storage device. Because of the high capacity in the shared memory, the physical memory may be used directly in some applications without mediation by a virtual memory system.

In one embodiment, the refresh circuits in the memory channel controller are implemented as a host port that bids for memory access in the same manner as other hosts (e.g., host interface circuits 391-1 to 391-*n* of FIG. 5). In that arrangement, when the refresh circuits are granted access to a block or partition, refresh may be performed on the memory arrays in the block or partition. Under this arrangement, refresh operations on unused portions of the shared memory may be disabled by suitable address-mapping in the memory channel controller, thereby achieving flexibility and efficiency in power management.

The above detailed description is provided to illustrate specific embodiments of the present invention and is not intended to be limiting. Numerous modification and variations within the scope of the present invention are possible. The present invention is set forth in the following claims.

We claim:

1. A memory channel controller for a shared memory, the shared memory being accessible through a plurality of memory ports, comprising:
   a plurality of host interface circuits, each host interface circuit being coupled to a respective host processor and each host interface circuit being configured to receive from the respective host processor memory access requests to the shared memory;
   a priority circuit configured to prioritize the memory access requests received on the plurality of host interface circuits to avoid a memory access conflict and to designate each prioritized memory access request to one of the memory ports for carrying out the memory access specified in that prioritized memory access request, wherein the priority circuit is configured to prioritize the memory access requests according to a priority scheme that evaluates assigned priority levels of the host processors making the memory access requests to grant memory access requests to host processors with higher priority and grant access to host processors with lower priority for a minimal amount of access to each memory port, the priority circuit further comprising a history register configured to store granted memory access requests within a predetermined number of preceding cycles, wherein the priority circuit disables bidding for access from host processors that have completed memory access requests within a recent predetermined time period;
a switch circuit; and
a plurality of memory interface circuits, each coupled to an associated one of the memory ports, wherein the switching circuit routes to each memory interface circuit the prioritized memory access requests designated for its associated memory port.

2. The memory channel controller of claim 1, wherein the host interface circuits each have a common modular configuration.

3. The memory channel controller of claim 1, wherein at least two of the host interface circuits comprise different modular configurations.

4. The memory channel controller of claim 1, wherein the memory interface circuits each have a common modular configuration.

5. The memory channel controller of claim 1, wherein the memory ports carry out memory accesses in parallel.

6. The memory channel controller of claim 1, wherein the shared memory is divided into a plurality of partitions, wherein each memory access request specifies access to one of the partitions, and wherein the memory access conflict arises when two or more memory access requests specify the same partition.

7. The memory channel controller of claim 6, wherein the priority circuit grants the memory access requests according to a priority scheme that ranks the host processors making the conflicting memory access requests.

8. The memory channel controller of claim 7, further comprising a configuration register in which the priority scheme is specified.

9. The memory channel controller of claim 8, wherein the configuration register can be dynamically modified.

10. The memory channel controller of claim 1, wherein the priority circuit locks out the designated memory port of each prioritized memory access request until the corresponding memory access request is complete.

11. The memory channel controller of claim 1, wherein the shared memory is divided into a plurality of partitions, wherein each memory access request specifies access to one of the partitions, and wherein the priority circuit locks out the partition specified in each prioritized memory access request until the memory access request is complete.

12. The memory channel controller of claim 1, wherein the shared memory is divided into a plurality of partitions, wherein each memory access request specifies access to one of the partitions, and wherein the memory access requests are prioritized such that memory access requests specifying different partitions proceed in parallel.

13. The memory channel controller of claim 1, further comprising a synchronizer which synchronizes memory access requests to a common clock domain and provides the synchronized memory access requests to the priority circuit.

14. The memory channel controller of claim 1, wherein one or more of the host interface circuits may break up a memory access requests into multiple memory access requests before providing the multiple memory access requests to the priority circuit.

15. The memory channel controller of claim 1, further comprising one or more memory request repositories each associated with one of the host interface circuits for holding memory requests received over the associated host interface circuit.

16. The memory channel controller of claim 15, wherein the memory access requests held in each memory request repository comprises memory access requests that have not been completely carried out.

17. The memory channel controller of claim 1, wherein each host interface circuit comprises a logic circuit configured for DMA operations that are carried out without host processor intervention.

18. The memory channel controller of claim 1, wherein at least one of the memory ports has a fanout greater than 1.

19. The memory channel controller of claim 1, wherein the priority circuit designates a prioritized memory access request to a memory port using an address specified in the prioritized memory access request.

20. The memory channel controller of claim 1, further comprising a network port that is associated with at least one of the host interface circuit, and wherein memory access requests received over the network port are submitted to the priority circuit for processing along with memory access requests received over other host interface circuits.

21. The memory channel controller of claim 1, wherein at least one of the host interface circuits conform to a DDR or HBM protocol.

22. The memory channel controller of claim 1, wherein at least one of the host interface circuits conform to a PCIe, CXL, or OpenCAPI industry standard interface.

23. The memory channel controller of claim 22, further comprising an archival port that is associated with at least one of the host interface circuit, wherein the archival port is coupled to a storage device, and wherein that host interface circuit tracks memory access requests that involve write operations and creates records thereof to the storage device.

24. The memory channel controller of claim 23, wherein the storage device comprises one of: a hard disk and a solid-state disk.

25. The memory channel controller of claim 23, wherein the storage device stores boot code that is executed upon power-up of the memory channel controller.

26. The memory channel controller of claim 1, wherein the shared memory comprises a multi-ported quasi-volatile (QV) memory.

27. The memory channel controller of claim 26, wherein the multi-ported QV memory comprises a plurality of QV memory modules.

28. The memory channel controller of claim 27, wherein the QV memory modules each comprise a plurality of memory dies or wafers stacked one on top of another.

29. The memory channel controller of claim 27, wherein QV memory modules are provided on a memory device configured according to a dual-in-line memory module (DIMM) format.

30. The memory channel controller of claim 26, wherein the QV memory provides run-time memory support for the memory channel controller's operations.

31. The memory channel controller of claim 1, wherein the priority circuit further implements a first-come-first-serve priority scheme to grant memory access requests to host processors based on arrival time.

32. The memory channel controller of claim 1, wherein the priority circuit provides an error signal to each host interface circuit in conjunction with each memory access request that is not allowed to proceed at the time of submission for a memory access conflict.

33. The memory channel controller of claim 32, wherein the priority circuit resolves the memory access conflict using a scheme that ranks the host processors sending the memory access requests involved in the memory access conflict.

34. The memory channel controller of claim 32, wherein the priority circuit resolves the memory access conflict using an address-based priority scheme.

35. The memory channel controller of claim 32, wherein each host interface circuit, upon receiving the error signal, follows a recovery procedure, wherein the recovery procedure comprises the host interface circuit receiving the error signal to resubmit the memory access request at a subsequent time.

36. The memory channel controller of claim 1, wherein each host interface circuit is modular in configuration and conforms to an industry standard.

37. The memory channel controller of claim 1, wherein at least one of the host interface circuits comprises a serial interface.

38. The memory channel controller of claim 1, wherein at least one of the memory interface circuits conform to the PCIe bus standard.

39. The memory channel controller of claim 1, wherein at least one of the memory interface circuits conforms to one of: InfiniBand and Gen-Z interface standards.

40. The memory channel controller of claim 1, wherein the shared memory requires a refresh operation which requires no participation by any of the host processors.

41. The memory channel controller of claim 40, wherein the refresh operation is initiated by one of host interface circuits providing a memory access request.

42. The memory channel controller of claim 40, wherein the shared memory is organized as a plurality of memory banks and wherein the refresh operation refreshes data in memory bank units.

\* \* \* \* \*